(12) United States Patent
Chen et al.

(10) Patent No.: US 9,479,779 B2
(45) Date of Patent: Oct. 25, 2016

(54) SUB-BITSTREAM EXTRACTION FOR MULTIVIEW, THREE-DIMENSIONAL (3D) AND SCALABLE MEDIA BITSTREAMS

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 421 days.

(21) Appl. No.: 14/042,524

(22) Filed: Sep. 30, 2013

(65) Prior Publication Data

US 2014/0092213 A1    Apr. 3, 2014

Related U.S. Application Data

(60) Provisional application No. 61/708,522, filed on Oct. 1, 2012.

(51) Int. Cl.
| | |
|---|---|
| *H04N 19/597* | (2014.01) |
| *H04N 21/2343* | (2011.01) |
| *H04N 19/30* | (2014.01) |
| *H04N 19/40* | (2014.01) |

(52) U.S. Cl.
CPC ........ *H04N 19/00769* (2013.01); *H04N 19/30* (2014.11); *H04N 19/40* (2014.11); *H04N 19/597* (2014.11); *H04N 21/2343* (2013.01)

(58) Field of Classification Search
CPC .... H04N 19/70; H04N 19/597; H04N 19/44; H04N 19/188; H04N 21/4343
USPC .......................... 348/43; 375/240.01, 240.25
See application file for complete search history.

(56) References Cited

U.S. PATENT DOCUMENTS

| | | |
|---|---|---|
| 2011/0032999 A1 | 2/2011 | Chen et al. |
| 2012/0036544 A1 | 2/2012 | Chen et al. |
| 2012/0056981 A1* | 3/2012 | Tian .................... H04N 19/597 348/42 |
| 2012/0229602 A1 | 9/2012 | Chen et al. |
| 2012/0269275 A1* | 10/2012 | Hannuksela ....... H04N 13/0048 375/240.25 |
| 2013/0027523 A1* | 1/2013 | Girdzijauskas .... H04N 13/0022 348/48 |
| 2013/0113882 A1 | 5/2013 | Haque et al. |
| 2013/0114670 A1 | 5/2013 | Chen et al. |
| 2013/0136176 A1 | 5/2013 | Chen et al. |
| 2013/0188738 A1 | 7/2013 | Hannuksela et al. |

OTHER PUBLICATIONS

Bartnik et al., "HEVC Extension for Multi view Video Coding and Multi view Video Plus Depth Coding", VCEG Meeting; MPEG Meeting; Feb. 3-10, 2012; Torino; (Video Coding Experts Group of ITU-T SG.16), No. VCEG-AR13, XP030003856, 42 pp.

(Continued)

*Primary Examiner* — Andy Rao
*Assistant Examiner* — Jared Walker
(74) *Attorney, Agent, or Firm* — Shumaker & Sieffert, P.A.

(57) ABSTRACT

Techniques are described for modal sub-bitstream extraction. For example, a network entity may select a sub-bitstream extraction mode from a plurality of sub-bitstream extraction modes. Each sub-bitstream extraction mode may define a particular manner in which to extract coded pictures from views or layers to allow a video decoder to decode target output views or layers for display. In this manner, the network entity may adaptively select the appropriate sub-bitstream extraction technique, rather than a rigid, fixed sub-bitstream extraction technique.

26 Claims, 7 Drawing Sheets

(56) References Cited

OTHER PUBLICATIONS

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 18-26, 2013, JCTVC-M0432)_v3, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen et al., "Support of Lightweight MVC to AVC Transcoding", JVT Meeting; Geneva, (Joint Video of ISO/IEC JTC1/SC29/WG11 and ITU-TSG.16_, No. JVT-AA036, Apr. 24-29, 2008, XP030007379, ISSN : 0000-0091, 10 pp.
Hannuksela et al., "3D-AVC Draft Text 3," Document JCT3V-A1002, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 68 pp.
International Search Report and Written Opinion—PCT/US2013/062893—ISA/EPO—Sep. 12, 2013, 12 pp.
ITU-T H.264, Series H: Audiovisual and Multimedia Systems, Infrastructure of audiovisual services—Coding of moving video, Advanced video coding for generic audiovisual services, Mar. 2010, 674 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Suzuki et al., "MVC Extension for Inclusion of Depth Maps Draft Text 4", JCT-3V Meeting; MPEG Meeting; Stockholm; (The Joint Collaborative Team on 3D Video Coding Extension Development of ISO/IEC JTC1/SC29/WG11 and ITU-T SG.16), No. JCT3V-A1001, XP030130179, Jul. 2012, 70 pp.
Tech et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pp.
Tech et al., "MV-HEVC Working Draft 1," Joint Collaborative Team on 3D Video Coding Extension Development of ITU-T SG 16 WP 3 and ISO/IEC JTC 1/SC 29/WG 11 1st Meeting: Stockholm, SE, Jul. 16-20, 2012, Document JCT3V-A1004_d0, 20 pp.
Wang et al., "MV-HEVC/SHVC HLS: Multi-mode Bitstream Extraction in HEVC 3DV and Scalable Extensions",JCT-3V Meeting; Incheon; (The Jpint Colloborative Team on 3D Video Coding Extension Development of ISO/IEC JTC1/SC29/WG11 and ITU-T SG.16) No. JCT3V-D0050, Apr. 20-26, 2013 XP030130714, 2 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Response to Written Opinion from corresponding PCT Application Serial No. PCT/US2013/062893 filed on May 5, 2014 (5 pages).
Second Written Opinion from corresponding PCT Application Serial No. PCT/US2013/062893 dated Aug. 22, 2014 (4 pages).
Response to Second Written Opinion from corresponding PCT Application Serial No. PCT/US2013/062893 filed on Oct. 20, 2014 (31 pages).
International Preliminary Report on Patentability from corresponding PCT Application Serial No. PCT/US2013/062893 dated Feb. 9, 2015 (7 pages).

* cited by examiner

SUB-BITSTREAM EXTRACTION FOR MULTIVIEW, THREE-DIMENSIONAL (3D) AND SCALABLE MEDIA BITSTREAMS

This application claims the benefit of U.S. Provisional Application No. 61/708,522 filed Oct. 1, 2012, the entire content of which is incorporated by reference herein.

TECHNICAL FIELD

This disclosure generally relates to processing video data and, more particularly, techniques for processing video data based on one or more video coding standards.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, transcoders, routers or other network devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, proprietary standards, open video compression formats such as VP8, and extensions of such standards, techniques or formats. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to video coding, and more particularly, this disclosure describes utilizing one of a plurality of sub-bitstream extraction modes to allow a device intermediate to a video encoder and a video decoder (e.g., a network entity) to select the appropriate extraction operation for purposes of sub-bitstream extraction. For instance, each sub-bitstream extraction mode may define a particular manner in which the device extracts data from a bitstream (e.g., coded pictures from views or layers) so that the video decoder can reconstruct target output views or target output layers. The extracted data from the bitstream may form a sub-bitstream. In this way, the device may not need to extract the sub-bitstream in a fixed, rigid manner, and can adapt to particular conditions for outputting the data for the target output views or target output layers.

In one example, the disclosure describes a method of processing video data, the method comprising receiving a bitstream of encoded video data, and selecting a sub-bitstream extraction mode from a plurality of sub-bitstream extraction modes. Each of the sub-bitstream extraction modes defines a manner in which to extract coded pictures from views or layers from the bitstream to allow decoding of target output views or target output layers, and each coded picture comprises one or more video coding layer network abstraction layer (VCL NAL) units of a view or a layer within an access unit. The method also includes extracting, from the bitstream, a sub-bitstream in the manner defined by the selected sub-bitstream extraction mode.

In one example, the disclosure describes a device for processing video data, the device comprising one or more processors configured to receive a bitstream of encoded video data, and select a sub-bitstream extraction mode from a plurality of sub-bitstream extraction modes. Each of the sub-bitstream extraction modes defines a manner in which to extract coded pictures from views or layers from the bitstream to allow decoding of target output views or target output layers, and each coded picture comprises one or more video coding layer network abstraction layer (VCL NAL) units of a view or a layer within an access unit. The one or more processors are also configured to extract, from the bitstream, a sub-bitstream in the manner defined by the selected sub-bitstream extraction mode.

In one example, the disclosure describes a computer-readable storage medium having instructions stored thereon that when executed by one or more processors of a device for processing video data cause the one or more processors to receive a bitstream of encoded video data, and select a sub-bitstream extraction mode from a plurality of sub-bitstream extraction modes. Each of the sub-bitstream extraction modes defines a manner in which to extract coded pictures from views or layers from the bitstream to allow decoding of target output views or target output layers, and each coded picture comprises one or more video coding layer network abstraction layer (VCL NAL) units of a view or a layer within an access unit. The instructions also cause the one or more processors to extract, from the bitstream, a sub-bitstream in the manner defined by the selected sub-bitstream extraction mode.

In one example, the disclosure describes a device for processing video data, the device comprising means for receiving a bitstream of encoded video data, and means for selecting a sub-bitstream extraction mode from a plurality of sub-bitstream extraction modes. Each of the sub-bitstream extraction modes defines a manner in which to extract coded pictures from views or layers from the bitstream to allow decoding of target output views or target output layers, and each coded picture comprises video coding layer network abstraction layer (VCL NAL) units of a view or a layer within an access unit. The device also includes means for extracting, from the bitstream, a sub-bitstream in the manner defined by the selected sub-bitstream extraction mode.

The details of one or more examples are set forth in the accompanying drawings and the description below. Other features, objects, and advantages will be apparent from the description and drawings, and from the claims.

DETAILED DESCRIPTION

Figure 1:
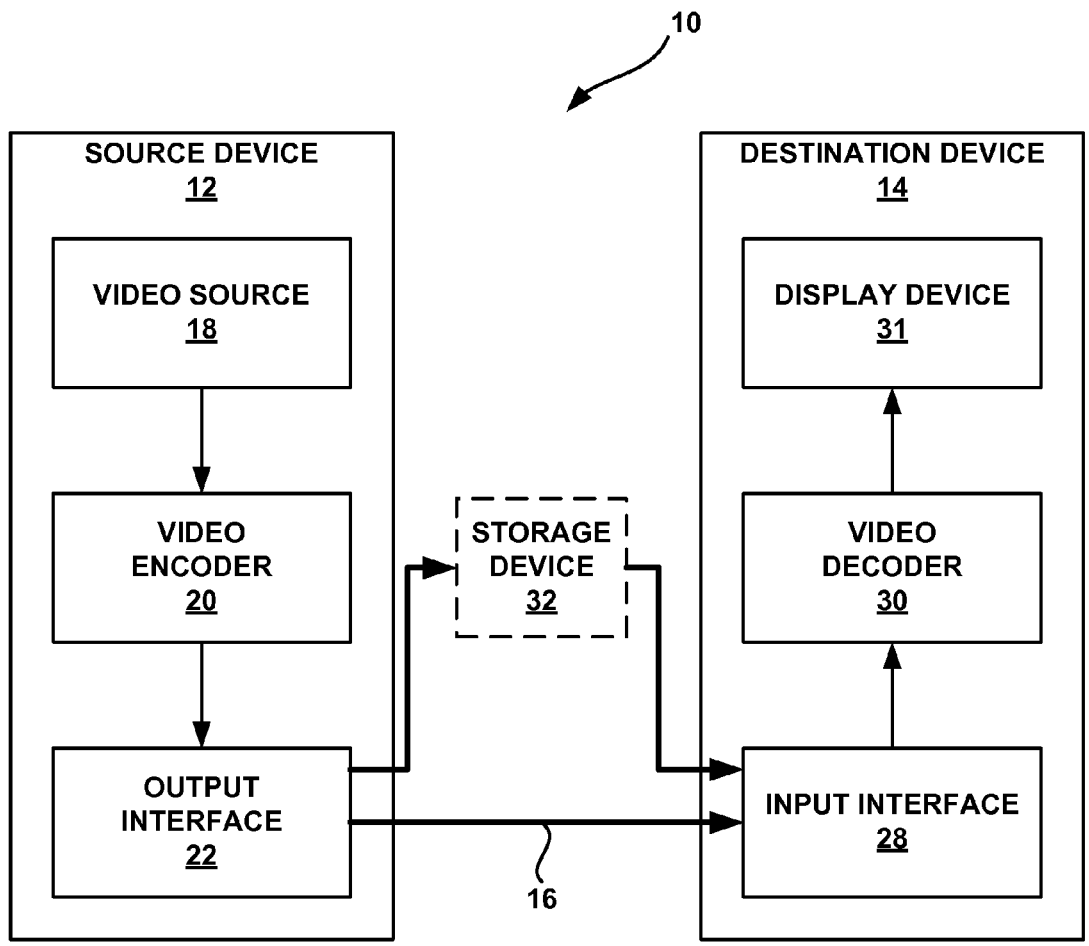
FIG. 1 is a block diagram illustrating an example video encoding and decoding system that may utilize the techniques described in this disclosure.

In multiview video coding, there are multiple views that each include multiple pictures. The term multiview video coding is used generically to refer to video coding techniques in which video data for multiple views is included in a coded bitstream such a video coding techniques in accordance with various multiview video coding standards as well as techniques that do not necessarily rely upon a video coding standard. The term multiview video coding may also be used to refer to video coding techniques in which multiple layers of video data are coded in a bitstream such as scalable video coding techniques. Techniques for multiview video coding may be controlled by various video coding standards, and the techniques described in this disclosure may be applicable to the various video coding standards, as well as techniques that do not rely upon a video coding standard.

In some cases, although a video encoder encodes many views or layers for a coded bitstream, a video decoder may only need to decode a subset of the views or layers in the coded bitstream. For example, for certain settings more views may be needed than for other settings. For instance, some devices may be capable of displaying many views, and some devices may be capable of displaying fewer views. Therefore, it may be beneficial to allow the devices to retrieve as many views or layers that the device is capable of decoding and displaying.

A view includes view components belonging to different access units, the view components may be also called coded pictures in this disclosure. A layer also includes coded pictures belonging to different access units. Coded pictures of all views or all layers belonging to the same access unit have the same output time. In the context of 3D video coding, each view may contain the texture part and depth part, mainly texture view and depth view. A texture view includes of coded texture pictures, also named as coded pictures of the texture view and coded depth pictures, also named as coded pictures of depth view. The coded texture pictures are also referred to as texture view components and the coded depth pictures are also referred to as depth view components. In the techniques described in this disclosure, each coded picture includes one or more video coding layer (VCL) network abstraction layer (NAL) (i.e., VCL NAL) units of a view or a layer within an access unit.

For some cases, a video decoder may decode a subset of the views or layers, instead of all of the views and layers, from the coded bitstream. For instance, bandwidth efficiencies can be gained by extracting and outputting coded pictures from the views or layers that the video decoder needs for decoding target output views or layers (e.g., those views or layers that are to be displayed), rather than outputting all of the views and layers including views and layers not needed for decoding the target output views or layers. To allow the video decoder to decode only a subset of the views, a network device (e.g., a device upstream from the device that includes the video decoder) or the device that includes the video decoder may extract the subset of views from the coded bitstream, and only transmit the extracted views to a device that includes the video decoder for decoding. This extraction of the subset of views from the coded bitstream is referred to as sub-bitstream extraction.

In multiview video coding, it may be possible to inter-predict one coded picture of one view, from another picture of another view. Such inter-prediction is referred to as inter-view prediction. In some cases, coded pictures from one of the views may be inter-predicted from pictures of a view that is not to be displayed. For example, assume that a display device (e.g., a mobile device or desktop) is to display view 0 and view 1 (e.g., the texture view of view 0 and view 1). In this example, view 0 and view 1 may be referred to as target output views (i.e., the views that are to be outputted for display). However, it may be possible that coded pictures (e.g., texture view components and depth view components) from view 1 are inter-predicted from coded pictures (e.g., texture view components and depth view components) of view 2. In this example, even though view 2 is not be displayed, the video decoder may still need to receive the video data associated with view 2 and decode such video data so that the video decoder can properly decode the video data of view 1.

For multiview video coding, in some cases, a view component of a view may be represented by two components: a texture view component and a depth view component. The texture view component includes the actual video content. The depth view component includes information indicating the relative depths of the pixels or objects within the video content.

For example, as described in more detail, in some examples of the sub-bitstream extraction processes described in this disclosure, when the sub-bitstream extraction process extracts coded pictures from the coded bitstream, the sub-bitstream extraction process may extract both the texture view components and the depth view components for decoding the target output views. In some examples of the sub-bitstream extraction processes described in this disclosure, when the sub-bitstream extraction process extracts coded pictures from the coded bitstream, the sub-bitstream extraction process may extract the texture view components, but not the depth view components, or vice-versa for decoding the target output views. In some examples of the sub-bitstream extraction processes described in this disclosure, when the sub-bitstream extraction process extracts coded pictures from the coded bitstream, the sub-bitstream extraction process may extract only the view components needed for decoding the target output views. As described in more detail, the sub-bitstream extraction process may be modal process in which a device determines the manner in which to extract the sub-bitstream, with the above description being a few examples of the manner in which the device may extract the sub-bitstream.

There may be certain issues with the manner in which sub-bitstream extraction is currently performed. For example, there is no mechanism to adaptively choose the extraction operation. Moreover, in some cases, a texture view component of a target output view may be inter-view predicted from the texture view component of a first non-target output, reference view, but the depth view component of the target output view may be predicted from a second different reference view. In this case, some sub-bitstream extraction techniques may still include the depth view component of the first non-target output, reference view although the depth view component of the first non-target output, reference view is not needed for decoding the target output view. The vice-versa is also possible as well (i.e., texture view components are not needed, but are included with the depth view components anyway).

The techniques described in this disclosure are generally related to an adaptive mechanism for selecting an appropriate sub-bitstream extraction process. Also, it should be understood that although the techniques are described with respect to multiview video coding, the techniques are also applicable to scalable video coding. In general, scalable video coding includes coding one or more layers of video data, each layer corresponding to various coding dimensions. For instance, the layers may include one or more of a spatial resolution layer, a chroma bit depth layer, a signal-to-noise ratio (SNR) layer, or the like. Furthermore, various views may be considered a layer of a view dimension. Thus, although generally described with respect to views for purposes of example, it should be understood that multiview video coding represents an example of a layer. Thus, references to a view may also be considered, more generally, references to a layer.

In some examples, an external means (e.g., an application processing interface (API) that takes an input from the end user or a default configuration of the system and passes the information to the device performing the sub-bitstream extraction) may define a sub-bitstream extraction mode that the device performing the sub-bitstream extraction implements. If no external means is available, then the device performing the sub-bitstream extraction may implement a default sub-bitstream extraction mode.

In this manner, the techniques allow for multi-mode sub-bitstream extraction, whereby the external means is able to define a sub-bitstream extraction mode from the plurality of sub-bitstream extraction modes. In other words, in the techniques described in this disclosure, the device performing the sub-bitstream extraction may be configurable (i.e., adaptable) with different mode types, and may then perform sub-bitstream extraction based on the defined mode. In some examples, it may be required that the output sub-bitstreams for some bitstream extraction modes are conforming bitstreams, while the output sub-bitstreams for some bitstream extraction modes are not required to be conforming bitstreams. This may result in a reduction in the complexity of ensuring whether bitstream subsets are conforming.

In some examples, the device performing the extraction may maintain two separate lists for texture views and depth views of the views that are to be extracted for decoding the output views. The first list may be for the texture views and the second list may be for the depth views. In this way, if the texture view of a non-target output view is needed, but the depth view is not, as indicated by the first list and the second list, then the device performing the extraction may remove the depth view components from the bitstream. Similarly, if the depth view of a non-target output view is needed, but the texture view is not, as indicated by the first list and the second list, then the device performing the extraction may remove the texture view components from the bitstream.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In some examples, a media aware network element (MANE) (not shown) may reside along link 16. As described in more detail, the disclosure describes sub-bitstream extraction processes. The MANE may be configured to implement the sub-bitstream extraction process. In this manner, the MANE may receive an encoded bitstream from source device 12, extract parts of the bitstream (i.e., perform sub-bitstream extraction), and output the extracted sub-bitstream to destination device 14.

However, relying on the MANE to implement the sub-bitstream extraction process is provided for purposes of illustration only and should not be considered limiting. In some examples, such as those where source device 12 transmits video data to destination device 14, source device 12 may be configured to implement the sub-bitstream extraction processes described in this disclosure. It may be possible for the sub-bitstream extraction processes to be performed further downstream from source device 12 (e.g., via the MANE). In some examples, it may even be possible for destination device 14 to implement the example sub-bitstream extraction processes described in this disclosure.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of the HEVC standard, referred to as "HEVC Working Draft 8" or "WD8," is described in document JCTVC-H1003, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, July 11-20, 2012, which, as of Sep. 30, 2013, is downloadable from http://phenix.int-evry.fr/jct/doc_en-d_user/documents/10 Stockholm/wg11/JCTVC-J1003-v8.zip, the entire content of which is incorporated herein by reference.

Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Sep. 30, 2013, is downloadable from http://phenix.int-evey.fr/jct/doc_end_user/documents/12 Geneva/wg11/JCTVC-L1003-v34.zip, the entire content of which is incorporated herein by reference. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of Sep. 30, 2013, is available from http://phenix.int-evry.fr/jct/doc_end_user/documents/13_Incheon/wg11/JCTVC-M0432-v3.zip, the entire content of which is incorporated herein by reference.

Alternatively, video encoder 20 and video decoder 30 may operate according to other proprietary or industry standards, such as the ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference.

In addition, there is a new video coding standard, as an extension of the MVC standard, namely "MVC+D", as described in "MVC Extension for Inclusion of Depth Maps Draft Text 4," JCT3V-A1001, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012. The entire content of "MVC Extension for Inclusion of Depth Maps Draft Text 4," JCT3V-A1001 is incorporated herein by reference. Besides the "MVC+D" standard, there are ongoing standard activities for so called 3D-AVC standard, MV-HEVC standard and potentially 3D-HEVC standard as well as the scalable codec of HEVC.

The latest 3D-AVC working draft is available at "3D-AVC Draft Text 3", JCT3V-A1002, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012. The entire content of "3D-AVC Draft Text 3", JCT3V-A1002 is incorporated herein by reference.

The latest MV-HEVC working draft is available at "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012. The entire content of "MV-HEVC Working Draft 1," JCT3V-A1004 is incorporated herein by reference.

The latest 3D-HEVC test model text is available at "3D-HEVC Test Model 1," JCT3V-A1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012. The entire content of "3D-HEVC Test Model 1," JCT3V-A1005 is incorporated herein by reference.

The techniques of this disclosure, however, are not limited to any particular coding standard. The techniques may be applicable to examples of video encoder 20 and video decoder 30 that are not based on a video coding standard. Other examples of video compression standards include MPEG-2 and ITU-T H.263, as well as open formats such as VP8.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. For example, video decoder 30 may be formed within a microcontroller or an integrated circuit (IC). In these examples, the term "device" may refer to the microcontroller or IC. As another example, video decoder 30 may be formed within a wireless communication device (e.g., the microcontroller or IC may be formed within the wireless communication device). In these examples, the term "device" may refer to the wireless communication device. In this sense, the term device may be used as any component that includes video decoder 30. Similarly, in some examples, a device may include video encoder 20.

Therefore, when this disclosure describes video decoding, such video decoding may be performed by a device that includes one of a microcontroller that includes video decoder 30, an IC that includes video decoder 30, and a wireless communication device (e.g., destination device 14) that includes video decoder 30. When this disclosure described video encoding, such video encoding may be performed by a device that includes one of a microcontroller that includes video encoder 20, an IC that includes video encoder 20, a wireless communication device (e.g., source device 12) that includes video encoder 20.

To assist with understanding video coding, the following provides a description of video coding as part of the HEVC standard. The HEVC standardization efforts are based on an evolving model of a video coding device referred to as the HEVC Test Model (HM). The HM presumes several additional capabilities of video coding devices relative to existing devices according to, for instance, ITU-T H.264/AVC.

In general, the working model of the HM describes that a video frame or picture may be divided into a sequence of treeblocks or largest coding units (LCU) that include both luma and chroma samples. A treeblock may serve some similar purposes as a macroblock of the H.264 standard, although a treeblock has many differences relative to a macroblock. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU may be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded (i.e., intra-prediction encoded), the PU may include data describing an intra-prediction mode for the PU. As another example, when the PU is inter-mode encoded (i.e., inter-prediction encoded), the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 or RefPicList1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock (i.e., LCU, or a CU, which includes a coding node and PUs and TUs).

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding (i.e., intra-prediction encoding or inter-prediction encoding) using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform (e.g., a discrete cosine transform (DCT), an integer transform, a wavelet transform, or a conceptually similar transform to residual video data). The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In some examples, video encoder 20 may perform an adaptive scan or may select a scan from a plurality of possible scans. After scanning the quantized transform coefficients to form a one-dimensional vector, video encoder 20 may entropy encode the one-dimensional vector (e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology). Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

This disclosure describes various methods for sub-bitstream extraction for multiview bitstreams, three-dimensional (3D) bitstreams, scalable media bitstreams, and other types of bitstream with multiple layers, such as multiple views. The techniques of this disclosure may also be applicable to multiview bitstreams, three-dimensional (3D) bitstreams and other types of bitstreams with multiple layers or views.

In this disclosure, the term multiview video coding is used to generically refer to techniques in which multiple different views are coded For example, there are different examples of video coding standards that define the manner in which multiple different views are coded in a bitstream. As described above, the examples of such video coding standards include: the multiview video coding (MVC) extension to the H.264/AVC video coding standard, MVC plus depth view components (MVC+D), 3D-AVC, multiview HEVC (MV-HEVC), and 3D-HEVC. The sub-bitstream extraction techniques described in this disclosure may be applicable to all of these video coding standards, as well as video coding techniques that do not rely upon a video coding standard. Moreover, the sub-bitstream extraction techniques described in this disclosure may also be applicable to scalable video coding (SVC), where there is only one view but multiple enhancement layers that can be selectively used to encode and decode the pictures. Again, though, multiple views may be considered a type of layer, and thus, the techniques of this disclosure may generally be applicable to any multi-layer coding techniques, where a view represents one example of a layer.

To avoid confusion, this disclosure uses the term "multiview video coding" to refer generically to all the various video coding techniques that rely on multiple views for encoding and decoding. As needed, this disclosure makes specific reference to specific video coding standards. Also, the techniques are described with respect to multiview video coding; however, the techniques are not so limited. The techniques described in this disclosure may also be applicable to scalable video coding techniques.

To assist with understanding, the following provides a brief description of the different multiview video coding standards. Such disclosure is meant to provide context for the sub-bitstream extraction techniques described in this disclosure, as well as assist with general understanding of multiview video coding techniques. The following disclosure describes multiview video coding (MVC), which is an extension of H.264/AVC. When this disclosure uses the acronym MVC, this disclosure is referring specifically to the MVC extension of H.264/AVC. When "multiview video coding" is written out, it is used generically to refer to various coding techniques for multiview video.

Figure 2:
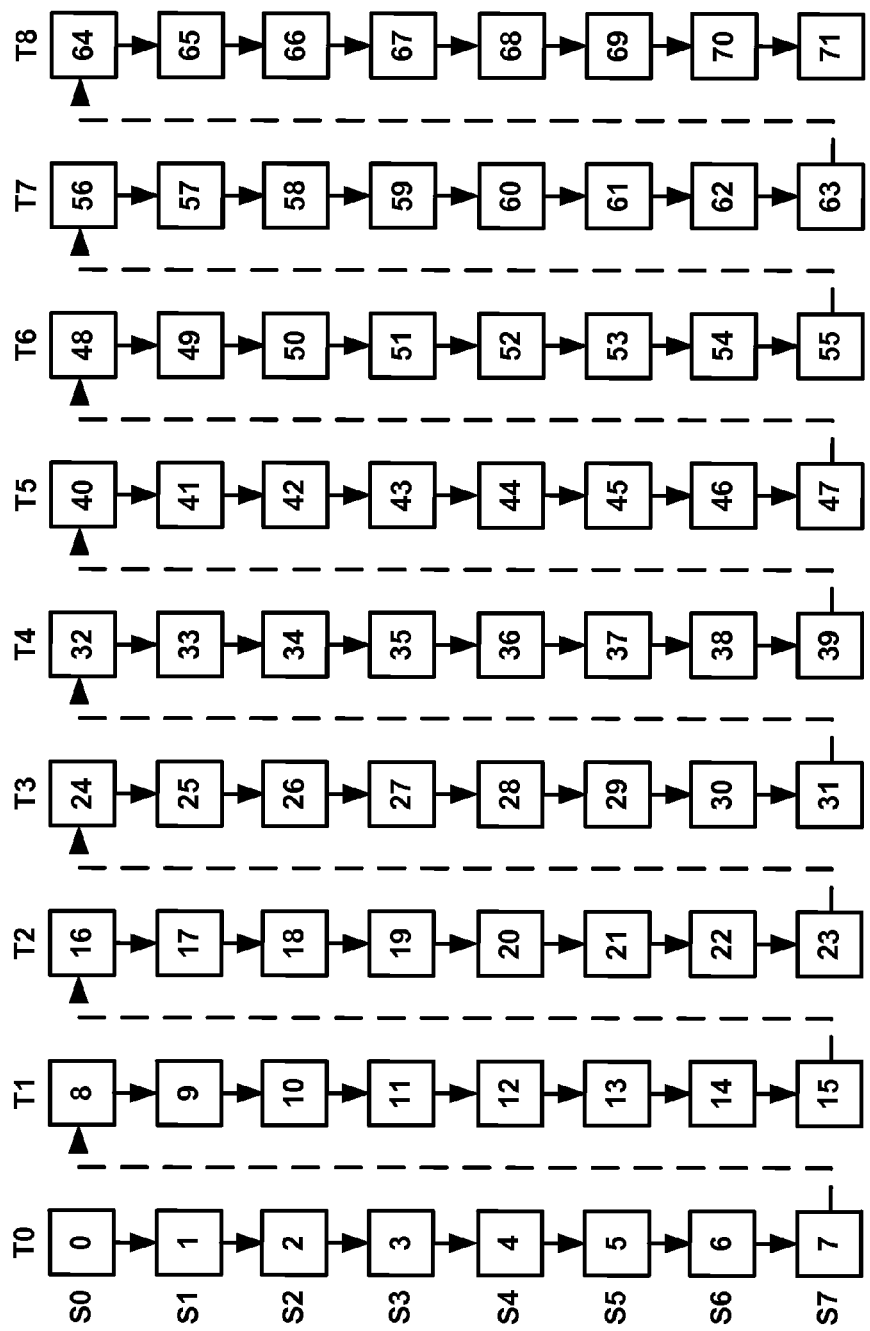
FIG. 2 is a graphical diagram illustrating an example encoding and decoding order, in accordance with one or more examples described in this disclosure.

FIG. 2 is a graphical diagram illustrating an example encoding and decoding order, in accordance with one or more examples described in this disclosure. For example, the decoding order arrangement illustrated in FIG. 2 is referred to as time-first coding. In FIG. 2, S0-S7 each refers to different views of multiview video. T0-T8 each represents one output time instance. In FIG. 2, each of the views includes sets of pictures. For example, view S0 includes set of coded pictures 0, 8, 16, 24, 32, 40, 48, 56, and 64, view S1 includes set of coded pictures 1, 9, 17, 25, 33, 41, 49, 57, and 65, and so forth.

It should be understood that the decoding order illustrated in FIG. 2 may not represent the output or display order. For example, a coded picture that is to be displayed or outputted later than another coded picture may be decoded earlier than the other picture. A picture order count (POC) value of a picture indicates a display order or an output order of the picture. For instance, a picture with a lower POC value is outputted or displayed earlier than a picture with a higher POC value. However, the picture with higher POC value may be decoded earlier than the picture with the lower POC value, even though the picture with the higher POC value is displayed or outputted later than the picture with the lower POC value.

An access unit may include the coded pictures of all views for one output time instance. For example, a first access unit includes all of the views S0-S7 for time instance T0 (i.e., coded pictures 0-7), a second access unit includes all of the views S0-S7 for time instance T1 (i.e., coded pictures 8-15), and so forth. In these examples, coded pictures 0-7 are at the a same time instance (i.e., time instance T0), coded pictures 8-15 are at a same time instance (i.e., time instance T1), and so forth.

In the techniques described in this disclosure, the device that performs the sub-bitstream extraction may extract coded pictures from the views or layers based on a selected manner in which to extract the coded pictures. For example, the device that performs the sub-bitstream extraction may extract coded pictures from views S0-S3 and output only those coded pictures, rather than outputting coded pictures from all views S0-S7. Such sub-bitstream extraction may promote bandwidth efficiency since destination device 14 may not be configured to display all views S0-S7 and outputting only the views that are needed to decode the views that are to be displayed may reduce the amount of data that needs to be outputted in the bitstream.

As used in this disclosure, the term "coded picture" is used to refer to a view component, a texture view component, or a depth view component. For example, each access unit may include one or more video coding layer (VCL) network abstraction layer (NAL) (i.e., VCL NAL) units. Each coded picture may include one or more VCL NAL units of a view or a layer within an access unit. In this manner, the techniques may extract coded pictures form views or layers from the bitstream to allow decoding of target output view or target output layers, wherein each coded picture comprises one or more VCL NAL units of a view or a layer within an access unit.

Figure 3:
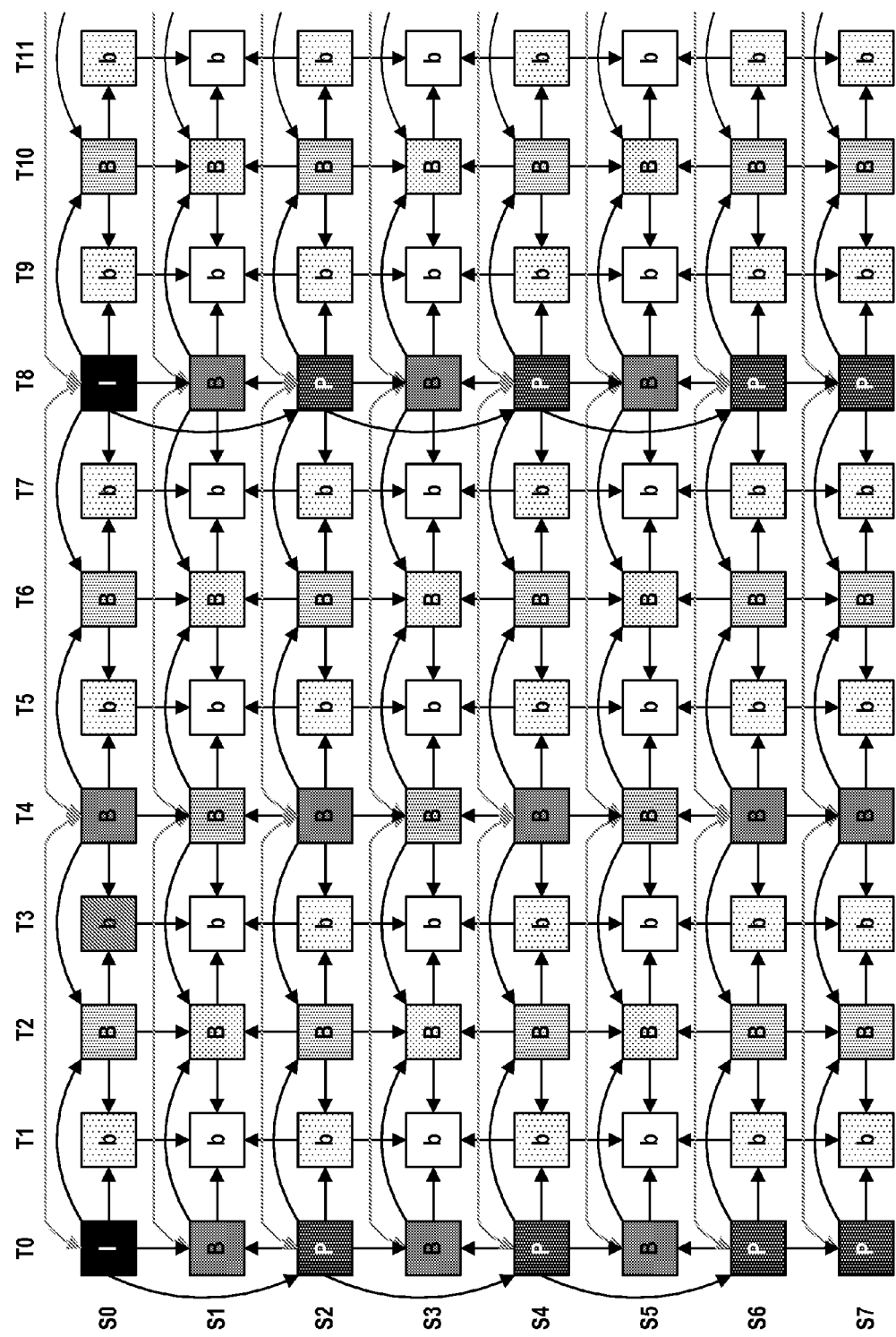
FIG. 3 is a conceptual diagram illustrating an example prediction pattern.

FIG. 3 is a conceptual diagram illustrating an example prediction pattern. In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location. In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames.

A typical MVC prediction (including both inter-picture prediction within each view and inter-view prediction) structure for multi-view video coding is shown in FIG. 3, where predictions are indicated by arrows, the pointed—to object using the point—from object for prediction reference. FIG. 3 may be an example of an MVC temporal and inter-view prediction structure.

In MVC, the inter-view prediction is supported by disparity motion compensation, which uses the syntax of the H.264/AVC motion compensation, but allows a picture in a different view to be used as a reference picture. Coding of two views could be supported also by MVC, and one of the advantages of MVC is that an MVC encoder could take more than two views as a 3D video input and an MVC decoder can decode such a multiview representation. So any renderer with MVC decoder may expect 3D video contents with more than two views.

In FIG. 3, view S0 may be considered as a base view, and views S1-S7 may be considered as dependent views. A base view includes coded pictures that are not inter-view predicted. A coded picture in a base view can be inter-predicted with respect to other coded pictures in the same view. For instance, none of the coded pictures in view S0 can be inter-predicted with respect to a coded picture in any of views S1-S7, but some of the coded pictures in view S0 can be inter-predicted with respect to other coded pictures in view S0.

A dependent view includes coded pictures that are inter-view predicted. For example, each one of views S1-S7 includes at least one coded picture that is inter-predicted with respect to a coded picture in another view. Coded pictures in a dependent view may be inter-predicted with respect to coded pictures in the base view, or may be inter-predicted with respect to coded pictures in other dependent views.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

Pictures in FIG. 3 are indicated at the intersection of each row and each column in FIG. 3. The H.264/AVC standard with multiview coding extensions may use the term frame to represent a portion of the video, while HEVC standard may use the term picture to represent a portion of the video. This disclosure uses the term picture and frame interchangeably.

The coded pictures in FIG. 3 are illustrated using a shaded block including a letter, designating whether the corresponding picture is intra-coded (that is, an I-picture), inter-coded in one direction (that is, as a P-picture), or inter-coded in multiple directions (that is, as a B-picture). In general, predictions are indicated by arrows, where the pointed—to pictures use the pointed—from picture for prediction reference. For example, the P-picture of view S2 at temporal location T0 is predicted from the I-picture of view S0 at temporal location T0.

As with single view video coding, coded pictures of a multiview video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a coded picture can use the coded pictures in other views for reference. In multiview coding, for example, inter-view prediction is realized as if the coded picture in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 3 provides various examples of inter-view prediction. Coded pictures of view S1, in the example of FIG. 3, are illustrated as being predicted from coded pictures at different temporal locations of view S1, as well as inter-view predicted from coded pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

For inter-prediction (i.e., inter-view prediction or prediction within the same view), video encoder 20 and video decoder 30 may each construct one or two reference picture lists (e.g., RefPicList0 and RefPicList1). In inter-view prediction, video encoder 20 and video decoder 30 may include a coded picture from a different view from the coded picture being inter-predicted in one or both of the reference picture lists as long as the picture is in the same time instance as the current picture. Video encoder 20 and video decoder 30 may include the inter-view prediction reference picture (e.g., coded picture from the different view) at any position within the reference picture list(s) similar to the manner in which video encoder 20 and video decoder 30 include a reference picture from the same view in the reference picture list(s).

FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that coded pictures relatively higher in the prediction hierarchy should be decoded before decoding coded pictures that are relatively lower in the hierarchy. Those coded pictures relatively higher in the hierarchy can be used as reference pictures during decoding of the coded pictures relatively lower in the hierarchy. A view order index is an index that indicates the decoding order of view components in an access unit. The view order indices are implied in the sequence parameter set (SPS) MVC extension, as specified in Annex H of H.264/AVC (the MVC amendment). In the SPS, for each index i, the corresponding view_id is signaled. The decoding of the view components may follow the ascending order of the view order index. If all the views are presented, then the view order indexes are in a consecutive order from 0 to num_views_minus_1.

In this manner, coded pictures used as reference pictures are decoded before coded pictures that depend on the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain coded pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S3 are predicted only from other views that are higher in the prediction hierarchy. Moreover, view S1 may be decoded before view S4, so long as view S1 is decoded after views S0 and S2.

In this manner, a hierarchical ordering may be used to describe views S0 through S7. In this disclosure, the notation "SA>SB" means that view SA should be decoded before view SB. Using this notation, S0>S2>S4>S6>S7, in the example of FIG. 3. Also, with respect to the example of FIG. 3, S0>S1, S2>S1, S2>S3, S4>S3, S4>S5, and S6>S5. Any decoding order for the views that does not violate this hierarchical ordering is possible. Accordingly, many different decoding orders are possible, with limitations based on the hierarchical ordering.

As described above, the references in the other views that may be used to inter-view predict the current coded picture are referred to as inter-view references or inter-view reference pictures, and the SPS MVC extension may be modified by the reference picture list construction. The following Table 1, which is a syntax table, illustrates the syntax of the SPS MVC extension.

syntax element) and a three-byte MVC NAL unit header extension if the NAL unit type is a prefix NAL unit or a MVC video coding layer (VCL) NAL unit. In some examples, the prefix NAL unit in MVC may contain only a NAL unit header and its MVC NAL unit header extension. The NAL unit header extension may include the following syntax elements: nor_idr_flag, priority_id, view_id, temporal_id, anchor_pic_flag, and inter_view_flag.

The nor_idr_flag syntax element may indicate whether the NAL unit belongs to an instantaneous decoding refresh (IDR) access unit that can be used as a closed-group of picture (GOP) random access point. The priority_id syntax element may be used for simple, one-dimensional adaptation. The view_id syntax element may indicate the view identifier of the current view. The temporal_id syntax element may indicate the temporal identification value or temporal level of the current NAL unit. The anchor_pic_flag syntax element may indicate whether the NAL unit belongs to an anchor picture that be used as an open-GOP random

TABLE 1

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signalled_minus1 | 0 | ue(v) |
| for( i = 0; i <= num_level_values_signalled_minus1; i++ ) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | |

In the SPS MVC extension, for each view, the number of views that can be used to form reference picture list 0 (RefPicList0) and reference picture list 1 (RefPicList1) are signaled. Prediction relationship for an anchor picture, as signaled in the SPS MVC extension may be different from the prediction relationship for a non-anchor picture (signaled in the SPS MVC extension) of the same view.

In video coding, including multiview coding, video encoder 20 may encapsulate the video data in network abstraction layer (NAL) units, and video decoder 30 may decode the NAL units to decode the video data. For example, video encoder 20 may encapsulate a coded picture in one or more VCL NAL units, and video decoder 30 decode the one or more VCL NAL units to decode the coded picture. An MVC NAL unit includes a one-byte NAL unit header (including the NAL unit type and the nal_ref_idc access point. The inter_view_flag syntax element may indicate whether the view component is used for inter-view prediction for NAL units in other views.

The previous described the MVC extension. The following describes some additional video coding standards.

For example, another video coding standard may be MVC+D, where the "D" refers to depth. In MVC, each view includes a plurality of view components (each being an example of a coded picture). MVC+D includes a depth component. For instance, in MVC+D each view may be considered as including a texture view and a depth view. The texture view includes texture view components, and the depth view includes depth view components. In other words, a view includes view components, and a view component includes a texture view component (one example of a coded picture) and a depth view component (another example of a coded picture). In this way, there is a texture view and a depth view for each view and a texture view component and a depth view component for each view component of a view. In other words, the texture view components of a view form the texture view of the view, and the depth view components of a view form the depth view of the view.

For every texture view component there may be a corresponding depth view component, and, in this sense, a texture view component may correspond to a depth view component, and vice-versa. A texture view component and a depth view component that correspond may be considered to be part of a same view component of a single access unit.

The texture view component of MVC+D includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, a pixel value corresponding to a purely white pixel in the depth view component may indicate that its corresponding pixel or pixels in the corresponding texture view component is closer from the perspective of the viewer, and a pixel value corresponding to a purely black pixel in the depth view component may indicate that its corresponding pixel or pixels in the corresponding texture view component is further away from the perspective of the viewer. The pixel values corresponding to the various shades of gray in between black and white indicate different depth levels. For instance, a very gray pixel in the depth view component indicates that its corresponding pixel in the texture view component is further away than a slightly gray pixel in the depth view component. Because only one pixel value, similar to gray scale, is needed to identify the depth of pixels, the depth view component may include only one pixel value. Thus, values analogous to chroma components are not needed.

The depth view component using only luma values (e.g., intensity values) to identify depth is provided for illustration purposes and should not be considered limiting. In some examples, any technique may be utilized to indicate relative depths of the pixels in the texture view component.

In MVC+D, the texture view components and the corresponding depth view components have no dependency to each other in MVC+D. In some examples, for a given 3D video operation point, the target output views may depend on different numbers of texture views and depth views for coding (e.g., encoding or decoding). Operation point and target output views are described in more detail below.

Another video coding standard is the 3D-AVC standard. The 3D-AVC codec may be compatible only to H.264/AVC but not MVC. New coding tools are needed for this standard. Also, there are dependency between texture and depth of the same view (i.e., a texture view component and its corresponding depth view component may be required to be inter-view predicted with respect to the same views).

In High Efficiency Video Coding (HEVC) standard, the NAL unit header contains two bytes, to drive the NAL unit type, the TemporalID (similar to the temporal_id in H.264/AVC) and the layer_id, which is always reserved to be 0 for the HEVC base view/layer. MV-HEVC is the multiview extension of HEVC without new coding tools. Each view is identified by a layer_id in the NAL unit header, in a way that layer_id is equivalent to view order index, which is similar to the view order index in MVC that defines the decoding order of the views in each access unit. 3D-HEVC supports coding of both texture only video and texture plus depth video. In 3D-HEVC, new coding tools are used for both texture and depth. The layer_id syntax element may be used in NAL unit header to identify a texture or depth view.

The above described the concept of an operation point and target output views. The operation point and target output views may be applicable to the multiview coding standards.

An operation point defines a subset of the views in multiview coding or a subset of the layers in scalable video coding. For instance, an operation point of a bitstream is associated with a set of layer_identifiers or view identifiers (view_id) and a temporal identifier (temporal_id or temporalID, as applicable). If a NAL unit's layer or view identifier is in an operation point's set of layer_identifiers or view identifiers and the NAL unit's temporal_identifier is less than or equal to the operation point's temporal identifier, the NAL unit is associated with the operation point.

An operation point representation is a bitstream subset (i.e., a sub-bitstream) that is associated with an operation point. The operation point representation of an operation point may include each NAL unit that is associated with the operation point. The operation point representation may not include VCL NAL units that are not associated with the operation point.

An external source may specify a set of layer or view identifiers for an operation point. For example, a content delivery network (CDN) device may specify the set of layer_identifiers. In this example, the CDN device may use the set of layer_identifiers to identify an operation point. The CDN device may then extract the operation point representation for the operation point and forward the operation point representation, instead of the original bitstream, to a client device. Extracting and forwarding the operation point representation to the client device may reduce the bit rate of the bitstream. In some examples, instead of or in addition to the CDN device, a device further downstream, such as a router, may perform the sub-bitstream extraction.

For example, the target output views may define the views that are to be received by destination device 14. In some examples, the CDN or some intermediate device, such as a network entity, may extract target output views. For instance, for movie theaters, it may be beneficial to display as many views as possible because of the relative size of the theatre screen and the positions of the viewers. For mobile device, the screen size may limit the number of views that can be displayed, and moreover, given that the viewing distance of the viewer will generally be proximate to the mobile device, it may only be necessary for the mobile device to receive a few views.

Figure 4:
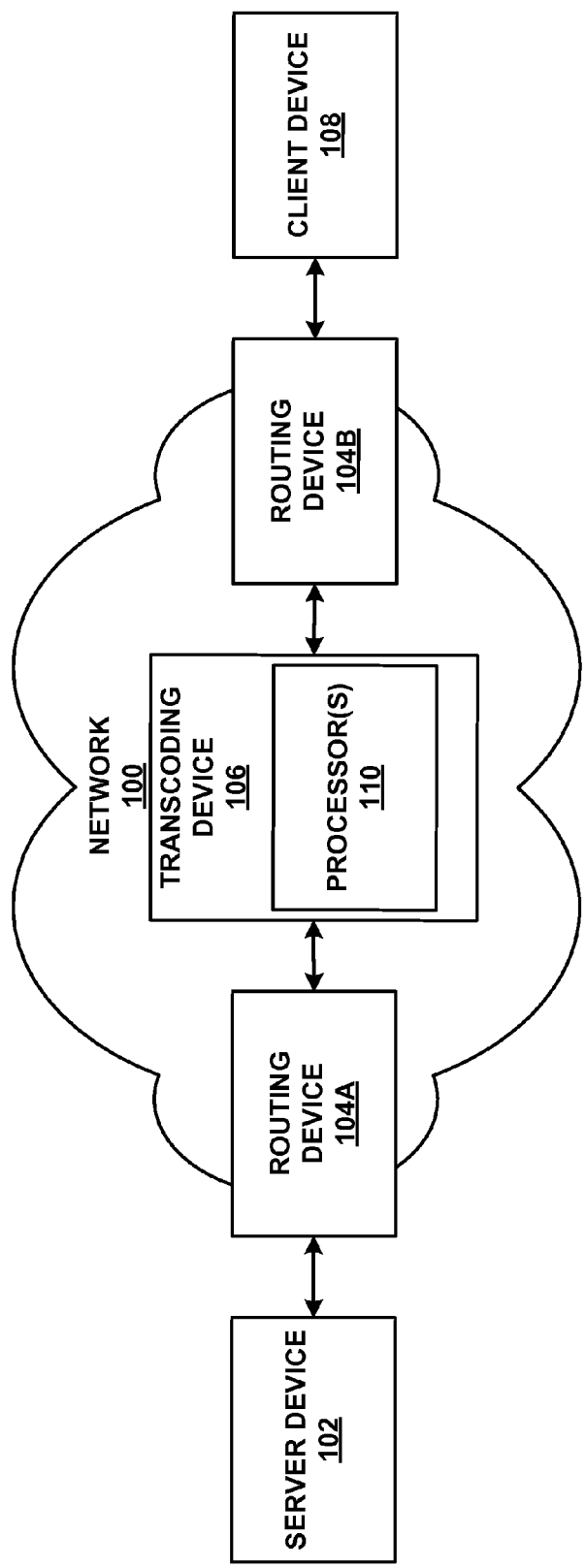
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

Routing devices 104 and possibly transcoding device 106 are examples of devices that may implement techniques described in this disclosure. For example, as part of routing video data from server device 102 to client device 108, routing devices 104 may receive a bitstream, and from the bitstream routing devices 104 may extract a sub-bitstream that is transmitted to client device 108. As described in more detail, routing devices 104 may extract a sub-bitstream utilizing the techniques described in this disclosure. In some examples, transcoding device 106 may be a media aware network entity (MANE) that performs the sub-bitstream extraction techniques described in this disclosure.

For example, transcoding device 106 may include one or more processors 110, and processor(s) 110 may be configured to implement the techniques described in this disclosure. Examples of processor(s) 110 include digital signal processors (DSPs), general purpose microprocessors, application specific integrated circuits (ASICs), field programmable logic arrays (FPGAs), or other equivalent integrated or discrete logic circuitry. In some examples, computer-readable storage medium may store instructions that when executed cause one or more processors 110 of transcoding device 106 to implement the techniques described in this disclosure.

In examples where routing devices 104 either alone or in combination with transcoding device 106 perform the techniques described in this disclosure, routing devices 104 may include one or more processors that either alone or in combination with one or more processors 110 implement the techniques described in this disclosure. Moreover, in this disclosure, when a device intermediate to video encoder 20 and video decoder 30 (e.g., a MANE device) is described as implementing the techniques described in this disclosure, such disclosure should be interpreted to mean that one or more processors, such as one or more processors 110, implementing the techniques described in this disclosure.

As described above, the techniques of this disclosure are generally related to sub-bitstream extraction, in which a device (e.g., routing devices 104 and/or transcoding device 106) may extract one or more views based on the target output views. In the H.264/AVC standard (i.e., "Advanced video coding for generic audiovisual services," ITU-T Recommendation H.264, June 2011), Annex H is directed to multiview video coding (MVC). In other words, Annex H includes the MVC extension for H.264/AVC. Section H.8 of Annex H of H.264/AVC defines the MVC decoding process. Subclause H.8.5 of Annex H is directed to the "Specification of bitstream subsets." Subclauses H.8.5.1 and H.8.5.2 specify the processes for deriving required anchor and non-anchor view components, respectively, that are used in the sub-bitstream extraction process. Subclause H.8.5.3 specifies the sub-bitstream extraction process. Subclause H.8.5.4 specifies the base view bitstream subset. Subclause H.8.5.5 gives an informative example for creation of a base view in case the original base view in the input bitstream to the bitstream extraction process is not included in the output bitstream subset.

The MVC+D specification leverages the bitstream extraction process defined in the H.264/AVC MVC extension. However, the H.264/AVC MVC extension did not include both texture view components and depth view components, and instead used the term view component. Because the MVC+D standard allows for depth view components, the MVC+D specification modified some of the subclauses of H.8.5 of H.264/AVC MVC extension.

Also, in the current MVC+D specification, once a texture or depth of one view is dependent by either the texture or depth of the target output views, both texture and depth views are included in the output sub-bitstream. For instance, assume that view 1 is an output view. Also, assume that texture components in view 1 are dependent upon texture components of view 0, and that depth components in view 1 are dependent upon depth components of view 2. In this example, in the current MVC+D specification, even though depth components of view 0 are not needed, depth components of view 0 are included in the output sub-bitstream because the texture components of view 0 are included. Also, in this example, in the current MVC+D specification, even though texture components of view 2 are not needed, texture components of view 2 are included in the output sub-bitstream because the depth components of view 1 are included.

The MVC+D specification, subclause A.1.1 of Annex A is directed to the specification of the bitstream subsets. The specifications of subclause H.8.5 of H.264/AVC MVC extension apply to subclause A.1.1 of MVC+D. Subclause A.1.1.1 of MVC+D is directed to the derivation process for required anchor view components, and is similar to subclause H.8.5.1 of H.264/AVC MVC extension with the substitution of "view component" in H.8.5.1 with either "depth view component" or "texture view component" and "view" in H.8.5.1 with either "depth view" or "texture view." Subclause A.1.1.2 of MVC+D is directed to the derivation process for required non-anchor view components, and is similar to H.8.5.2 of H.264/AVC MVC extension with the substitution of "view component" with either "depth view component" or "texture view component" and "view" with either "depth view" or "texture view."

Subclause A.1.1.3 of MVC+D is directed to the sub-bitstream extraction process. In MVC+D, it may be requirement of bitstream conformance that any sub-bitstream that is the output of the process specified in this subclause with pIdTarget (priority_id target value) equal to any value in the range of 0 to 63, inclusive, tIdTarget (temporal_id or temporalID target value) equal to any value in the range of 0 to 7, inclusive, viewIdTargetList consisting of any one or more values of viewIdTarget identifying the views in the bitstream may be conforming to the MVC+D standard.

The viewIdTarget may be the target output views that a device intermediate to video encoder 20 and video decoder 30 (e.g., a network entity) determined as the target output views for destination device 14. Also, a conforming bitstream contains one or more coded slice NAL units with priority_id equal to 0 and temporal_id equal to 0. Moreover, it may be possible that not all operation points of sub-bitstreams resulting from the sub-bitstream extraction process have an applicable level_idc or level_idc[i]. In this case, each coded video sequence in a sub-bitstream may still be required to conform to one or more of the profiles specified in Annex A, Annex H, and Annex I of MVC+D, but may not satisfy the level constraints specified in subclauses A.3, H.10.2, and I.10.2, respectively, of MVC+D.

The inputs to the sub-bitstream extraction process may be: a variable depthPresentFlagTarget (when present), a variable pIdTarget (when present), a variable tIdTarget (when present), and a list viewIdTargetList consisting of one or more values of viewIdTarget (when present). The output of the sub-bitstream extraction process may be a sub-bitstream and one or more VOIdx (view order index) for a list of view orders (VOidxList).

When depthPresentFlagTarget is not present as input, the depthPresentFlagTarget may be inferred to be equal to 0. When pIdTarget is not present as input, pIdTarget may be inferred to be equal to 63. When tIdTarget is not present as input, tIdTarget may be inferred to be equal to 7.

In the current MVC+D specification, a device (e.g., a network entity that is intermediate to video encoder 20 and video decoder 30) may derive the sub-bitstream from a bitstream constructed by video encoder 20 by applying the following operations in sequential order. For instance, the device may let VOIdxList be empty and minVOIdx be the VOIdx value of the base view. For each value of viewIdTarget included in viewIdTargetList, the device may invoke the process specified in subclause H.8.5.1 for texture views with viewIdTarget as input. If depthPresentFlagTarget is equal to 1, for each value of viewIdTarget included in viewIdTargetList, the device may invoke the process specified in subclause H.8.5.1 for depth views with the viewIdTarget as input.

For each value of viewIdTarget included in viewIdTarget list, the device may invoke the process specified in subclause H.8.5.2 for texture views with the value of viewIdTarget as input. If depthPresentFlagTarget is equal to 1, for each value of viewIdTarget included in viewIdTargetList, the device may invoke the process specified in subclause H.8.5.2 for depth views with the viewIdTarget as input.

The device may then mark all VCL NAL units and filler data NAL units for which any of the following conditions are true as "to be removed from the bitstream": priority_id is greater than pIdTarget, temporal_id is greater than tIdTarget, anchor_pic_flag is equal to 1 and view_id is not marked as "required for anchor," anchor_pic_flag is equal to 0 and view_id is not marked as "required for anchor," nal_ref_idc is equal to 0 and inter_view_flag is equal to 0 and view_id is not equal to any value in list viewIdTargetList, or nal_unit_type is equal to 21 and depthPresentFlagTarget is equal to 0. The device may then remove all access units for which all VCL NAL units are marked as "to be removed from the bitstream," and may remove all VCL NAL units and filler data NAL units that are marked as "to be removed from the bitstream."

When VOIdxList includes only one value of VOIdx that is equal to minVOIdx, the device may remove the following NAL units: (1) all NAL units with nal_unit_type equal to 14 or 15, and (2) all NAL units with nal_unit_type equal to 6 in which the first supplemental enhancement information (SEI) message has payloadType in range of 36 to 44, inclusive. In cases where VOIdxList includes only one value of VOIdx equal to minVOIdx, the sub-bitstream may include only the base view or only a temporal subset of the base view. When depthPresentFlagTarget is equal to 0, the device may remove all NAL units with nal_unit_type equal to 6 in which the first SEI message has payloadType in range of 45 to 47, inclusive.

In the sub-bitstream extraction process, let maxTid be the maximum temporal_id of all the remaining VCL NAL units. The device may remove all NAL units with nal_unit_type equal to 6 that only contain SEI messages that are part of an MVC scalable nesting SEI message with any of the following properties: (1) operation_point_flag is equal to 0 and all_view_components_in_au_flag is equal to 0 and none of sei_view_id[i] for all i in the range of 0 to num_view_components_minus1, inclusive, corresponds to a VOIdx value included in VOIdxList, or (2) operation_point_flag is equal to 1 and either sei_op_temporal_id is greater than maxTid or the list of sei_op_view_id[i] for all i in the range of 0 to num_view_components_op_minus1, inclusive, is not a subset of viewIdTargetList (i.e., it is not true that sei_op_view_id[i] for any i in the range of 0 to num_view_components_op_minus1, inclusive, is equal to a value in viewIdTargetList). The device may also remove each view scalability information SEI message and each operation point not present SEI message, when present.

When VOIdxList does not include a value of VOIdx equal to minVOIdx, the view with VOIdx equal to the minimum VOIdx value included in VOIdxList is converted to the base view of the extracted sub-bitstream. An informative procedure that outlines key processing step to create a base view is described in subclause 1.8.5.6 in MVC+D specification. When VOIdxList does not include a value VOIdx equal to minVOIdx, the resulting sub-bitstream according to the operations above may not contain a base view that conforms to one or more profiles specified in Annex A of the MVC+D specification. In this case, by the last operation step, the remaining view with the new minimum VOIdx values is converted to be the new base view that conforms to one or more profiles specified in Annex A and Annex H.

In this manner, a network entity, which is a device intermediate to video encoder 20 and video decoder 30 (e.g., routing devices 104 and/or transcoding device 106), may extract a sub-bitstream from the bitstream generated by video encoder 20 in accordance with the current MVC+D standard, and with respect to H.8.5, the MVC standard. The device intermediate to video encoder 20 and video decoder 30 may implement similar techniques for sub-bitstream extraction for scalable video or for other multiview coding standards (e.g., 3D-AVC, MV-HEVC, and 3D-HEVC).

However, there may be certain issues with the existing sub-bitstream extraction processes for SVC, MVC, and MVC+D, as a few examples. As one example, for some sub-bitstream extraction processes, there may be no mechanism for a sub-bitstream extraction process to adaptively choose the extraction operation. In some instances, the sub-bitstream extraction process may be limited to either a first extraction technique or a second extraction technique, without an adaptive mechanism for selecting the appropriate extraction technique.

To understand sub-bitstream extraction, this disclosure uses the terms "target output view" and "target view" or "subset of views." The target view may be a view of the subset of views. In some examples, the disclosure may simply use the term "view" when referring to a "target view." In the context of bitstream extraction, a target view is simply referred to a view which has coded pictures to be extracted out to be in the sub-bitstream. The target output view is the view that is to be displayed on display device 31. A subset of views refer to the views that are needed to properly decode the target output view, even if a view in the subset of views is not displayed. The target output view may be one of the views in the subset of views, but there may be additional views. More generally, if both texture view components and depth view components or one of texture view components or depth view components of a view or coded pictures of a layer in scalable video coding are needed for decoding a target output view, the view or layer may be considered as being a view in the subset of views or subset of layers needed for decoding a target output view or target output layer.

As an example, referring back to FIG. 3, assume that the views to be displayed are views S2 and S3. In this example, the list of target output views includes views S2 and S3. As illustrated in FIG. 3, coded pictures in view S2 are inter-view predicted with coded pictures in view S0 (e.g., the first picture of view S2 is inter-view predicted with the first picture of view S0). Therefore, to properly decode the coded pictures of view S2, video decoder 30 may need the coded pictures from view S0, even though view S0 is not to be displayed. Also, as illustrated in FIG. 3, coded pictures in view S3 are inter-view predicted with coded pictures in view S4 and S2. Therefore, to properly decode the coded pictures of view S3, video decoder 30 may need the coded pictures from view S2 (which video decoder 30 will receive since view S2 is a target output view). In this example, video decoder 30 may also need the coded pictures from view S4, even though view S4 is not to be displayed. Accordingly, in this example, the subset of views includes views S0, S2, S3, and S4. No other views are needed to properly decode views S2 and S3 (the target output views), and can therefore be discarded (removed from the bitstream).

In the first extraction technique, the sub-bitstream extraction process may need to target at the minimum size of the resulting sub-bitstream, by discarding as much possible data that is not required for decoding of a list of target output views or a list of target output layers. This first extraction technique may be suitable as a response to a request by a particular end user terminal (e.g., a particular one of destination device 14 or client device 108).

This first extraction technique may be referred to as an "optimal sub-bitstream extraction technique." In this optimal sub-bitstream extraction technique, the device intermediate to video encoder 20 and video decoder 30 may remove video data for any coded picture that is not needed for decoding the output views or output layers. For instance, keeping with the previous example where the target output views are view S2 and view S3, view S0 may be a view of the subset of views because pictures of view S0 are needed to decode view S2, and coded pictures of view S2 are needed to decode view S3. However, not all coded pictures of view S0 are needed to decode the coded pictures of view S2 and S3. As an example, referring back to FIG. 3, the coded picture at time T1 of view S0 is not needed to decode any of the coded pictures in view S2 and view S3 (e.g., none of the coded pictures in view S2 and S3 are inter-view predicted with the coded picture at time T1 of view S0 and none of the coded pictures in view S2 and S3 are inter-view predicted with a coded picture that is inter-predicted with the coded picture at time T1 of view S0). Therefore, even though view S0 is a view of the subset of views, not all coded pictures of view S0 are needed to decode the target output views. In the optimal sub-bitstream extraction technique, the device intermediate to video encoder 20 and video decoder 30 may remove the coded picture at time T1 of view S0, and not include this coded picture in the sub-bitstream. For example, the device intermediate to video encoder 20 and video decoder 30 may remove both the texture view component and the depth view component.

In the second extraction technique, the sub-bitstream extraction process may need to target at the self-completeness of the output sub-bitstream. To achieve the self-completeness of the output sub-bitstream, the sub-bitstream extraction process may maintain one or more of the following: each layer to be complete, each view to have both texture views and depth views if depth view is present for at least one view, and each view component to have both texture view component and depth view component if at least one depth view component exists in the output sub-bitstream. In this case, examples of a layer include a spatial/quality scalable layer, a texture view, or a depth view. For a layer to be complete may mean to have an access unit at a temporal location whenever another layer has it. A self-complete sub-bitstream is still "fully extractable" and may be more useful if the sub-bitstream extraction is performed by a streaming server (e.g., server device 102) or an intermediate network element (e.g., a MANE device) and any subset of the views included in the output may be requested as the list of target output views. In these examples, a streaming server or an intermediate network element are examples of a network entity.

The second extraction technique may be referred to as a "self-complete sub-bitstream extraction technique." In the self-complete sub-bitstream extraction technique, both view components of a view are included in the sub-bitstream, even if both view components are not needed for decoding the output views. For instance, in FIG. 3, assume that the texture view component of the view component at time T0 of view S4 is needed to decode the texture view component of the view component at time T0 of view S3. Also, assume that the depth view component of the view component at time T0 of view S4 is not needed to decode the depth view component of the view component at time T0 of view S3. In the "self-complete extraction technique," because the texture view component of the view component at time T0 of view S4 is included in the sub-bitstream to decode view S3, the device intermediate to video encoder 20 and video decoder 30 (e.g., a network entity) may include both the texture view component and the depth view component of the view component at time T0 of view S4.

The first and second extraction techniques described above are described for purposes of illustration only and should not be considered limiting. In general, in some other techniques, the device performing the sub-bitstream extraction process may not be able to adapt the sub-bitstream extraction technique (e.g., the device may not be configurable to selectively implement one of the two extraction techniques described above). Rather, the device may be limited to either the first or the second extraction technique. Being limited to either the first or second extraction technique may result in less optimal sub-bitstream extraction then would be otherwise possible.

Furthermore, the sub-bitstream extraction process in the MVC+D draft specification may not be optimal and may have the following problems or shortcomings. For example, the texture view components of the target output views may be inter-view predicted with the texture view components of a set of views, and the depth view components of the target output views may not be inter-view predicted with the depth view components of the set of views. However, even though the depth view components of the set of views are not needed for decoding the target output views, the depth view components of the set of views may nevertheless be included in the sub-bitstream. Similarly, the depth view components of the target output views may be inter-view predicted with the depth view components of a set of views, and the texture view components of the target output views may not be inter-view predicted with the texture view components of the set of views. However, even though the texture view components of the set of views is not needed for decoding the target output views, the texture view components of the set of views may nevertheless be included in the sub-bitstream.

The sub-bitstream extraction techniques described in this disclosure may be directed to an adaptive (e.g., selective)

manner in which to select the extraction process. Moreover, the sub-bitstream extraction techniques may provide for an optimized bitstream extraction process with improvements for the MVC+D video coding specification.

For purposes of illustration, the sub-bitstream extraction process, in accordance with the techniques described in this disclosure, may be performed by a network entity, an example of which is a MANE device. For instance, routing devices 104 and/or transcoding device 106 may be considered as a MANE device. In some examples, server device 102 may implement the techniques described in this disclosure, but solely for ease of description, the techniques are described with a network entity that is intermediate to server device 102 and client device 108. It may even be possible for client device 108 to implement the techniques described in this disclosure, but generally the techniques described in this disclosure will be performed by an intermediate device (e.g., a network entity like a MANE device).

In the techniques described in this disclosure, the sub-bitstream extraction process may define a plurality of sub-bitstream extraction modes. An external means may determine the particular sub-bitstream extraction mode. The term "external means" refers to generically to a hardware unit or a software unit executing on a hardware unit that is external to video decoder 30 (e.g., the video decoder that is to receive the extracted sub-bitstream). For example, the external means may be a component of the device intermediate to video encoder 20 and video decoder 30 such as a MANE device and/or server device 102. Such a component in the MANE device may not be specified in a video coding specification. For instance, the external means may set one or more variables for which the value is used by the MANE device and/or video decoder 30, but the value may be set outside of the MANE device and/or video decoder 30 and provide as an input to the MANE device and/or video decoder 30.

As one example, the MANE device may execute software or firmware, on hardware, that conforms to an application processing interface (API) (e.g., the MANE device may include the hardware unit that forms the external means or may include the software unit executing on the hardware unit that forms the external means). This software or firmware is one example of the external means. For instance, to select the sub-bitstream extraction mode, the MANE device may receive from the external means a value indicative of the selected extraction mode. The external means may set one or more variables for which the value is used by the MANE device and/or video decoder 30, but the external means may determine the value outside of the MANE device and/or video decoder 30. The external means may provide the value as an input to the MANE device and/or video decoder 30, and the MANE device may use the input to extract the sub-bitstream in the selected manner.

In some examples, this software or firmware may receive an input information from client device 108 or destination device 14 indicating the characteristics of client device 108 or destination device 14 (e.g., mobile device or desktop device, size of display device 31, decoding capabilities of video decoder 30, exact requirements of the target output views that can be received, and the like). In some examples, this software or firmware may determine information regarding the characteristics of the connection to client device 108 or destination device 14 (e.g., type of subnetwork, bandwidth requirements for safe, optimal, or some intermediate level of reception, and the like).

From the received or determined information, the software or firmware may determine the particular sub-bitstream extraction mode (e.g., select a mode from the plurality of sub-bitstream extraction modes). For example, the software or firmware may maintain a list of sub-bitstream extraction modes, where each sub-bitstream extraction mode indicates a particular manner in which to perform the sub-bitstream extraction. In this example, the software or firmware may determine a value (e.g., an index into the list of sub-bitstream extraction modes) that identifies the selected sub-bitstream extraction mode. The software or firmware may output the determined value to the MANE device, and in turn, the MANE device may determine the selected sub-bitstream extraction mode, and extract the sub-bitstream from the received coded bitstream in the manner defined by the selected sub-bitstream extraction mode.

In some examples, instead of or in addition to software or firmware executing on a hardware unit of the MANE device, the MANE device may include a hardware unit configured to receive or determine information of the characteristics of client device 108 or destination device 14 or the connection of client device 108 or destination device 14, and select a particular sub-bitstream extraction mode. This hardware unit is another example of an external means.

In the techniques described in this disclosure, the external means may set one or more variables that each define the manner in which the sub-bitstream is to be extracted. The external means may select a value from the one or more variables, and the MANE device may receive the value. The external means may also output the value to video decoder 30. Video decoder 30 may receive the value and determine the sub-bitstream that video decoder 30 is to receive. Video decoder 30 may then decode the target output views or layers based on the value indicating the sub-bitstream that video decoder 30 is to receive. In this sense, the external means may be a unit that is external to video decoder 30 that sets one or more variables whose value is used by video decoder 30 and provided to video decoder 30 as an input.

If the external means is not present, the MANE device may be configured to select a default sub-bitstream extraction mode. The default sub-bitstream extraction mode may be a mode that identifies anyone of the possible sub-bitstream extraction techniques. In some example, the video coding specification may define a default sub-bitstream extraction technique, and the default sub-bitstream extraction mode may identify the sub-bitstream extraction technique defined by the video coding specification as the default sub-bitstream extraction technique.

As described above, each value of the sub-bitstream extraction mode may identify a specific sub-bitstream extraction technique to be used in generating the extracted sub-bitstream output. As one example, a mode of the plurality of modes may define that the MANE device should maintain the maximum self-completeness in the extracted sub-bitstream that is outputted. For instance, both the depth view and texture view components or each layer is included in the outputted sub-bitstream. As another example, a mode of the plurality of modes may define that the MANE device should extract the sub-bitstream having the minimum size. For instance, the MANE device may extract from the bitstream only the coded pictures needed for decoding the target output view or the target output layer.

In other words, one example sub-bitstream extraction mode may be the "optimal sub-bitstream extraction" mode. Another example sub-bitstream extraction mode may be the "self-complete sub-bitstream extraction" mode. In this example, assume that the extraction mode value 0 refers to the optimal sub-bitstream extraction mode, and that the extraction mode value 1 refers to the self-complete sub-bitstream extraction mode. If the external means selects the extraction mode value 0, the MANE device may remove as much video data as possible from the bitstream, while ensuring that there is sufficient video data to decode the target output views. If the external means selects the extraction mode value 1, the MANE device may include both the target view components and the depth view_components of the views if either the target view component or the depth view component is needed for decoding the target output views.

As another example, a mode of the plurality of modes may define that the MANE should maintain an intermediate self-completeness (e.g., each layer being complete, each view, which may include two layers, one texture view and one depth view being complete). This mode may be referred to as the "intermediate sub-bitstream extraction" mode. In the intermediate sub-bitstream extraction mode, the MANE may keep only the view components needed for decoding the target output views. For example, if the texture view components of a view are needed, but the depth view components of the view are not needed for decoding the target output views, the MANE device may output the texture view components for the view, and may not output the depth view components. Similarly, in the intermediate sub-bitstream extraction mode, if the depth view components of a view are needed, but the texture view components of the view are not needed for decoding the target output views, the MANE device may output the depth view components for the view, and may not output the texture view components.

There may be multiple examples of intermediate self-completeness, and each of these levels may represent a mode of the plurality of sub-bitstream extraction modes. For example, in one example of an intermediate sub-bitstream extraction mode, the MANE may keep both the texture view components and the depth view components of views, even if both are not needed, but may remove the texture view components and the depth view components if both are not needed for decoding the target output view. In other words, if the texture view component of a view is to be included, then the MANE device may include the depth view component as well, even if not needed for decoding the target output views. However, if both the texture view component and the depth view component of a view are not needed for decoding the target output view, then the MANE device may remove both the texture view component and the depth view component of the target view.

This example of the intermediate self-complete extraction technique may be different than the self-complete extraction technique because in the self-complete extraction technique both the texture view components and the depth view components of a view may be included in the sub-bitstream even if neither is needed so that the view can be fully extractable. In this example of the intermediate self-complete extraction technique, if a texture view component or depth view component of a view is needed, both are included in the output sub-bitstream, and if neither of the view is needed, then neither is included in the output sub-bitstream.

There may also be other selectable modes that define the manner in which the sub-bitstream should be extracted, in addition to those described above, and the example modes described above should not be considered limiting. For instance, the techniques described in this disclosure are not limited to the specific sub-bitstream extraction modes described above. In general, the techniques described in this disclosure may be extended to examples where the external means selects a sub-bitstream extraction mode from a plurality of sub-bitstream extraction modes and the MANE device extracts the sub-bitstream in accordance with the selected sub-bitstream extraction mode, which allows for an adaptive sub-bitstream extraction technique. The optimal sub-bitstream extraction mode, the self-complete sub-bitstream extraction mode, and the examples of intermediate sub-bitstream extraction modes are provided for purposes of illustration. Additional modes or other types of extraction modes may be possible for the example adaptive sub-bitstream extraction techniques described in this disclosure.

The multi-mode sub-bitstream extraction techniques described in this disclosure may be applicable for any scalable media codec, including non-video codecs. In other words, although the techniques described in this disclosure are described with respect to video coding, the techniques are not so limited and may be extended generally to media coding techniques.

Also, not all of the sub-bitstream extraction modes may be required to result in a conforming bitstream. For example, if the MANE device extracts the sub-bitstream in a manner defined by a one of the sub-bitstream extraction modes, the resulting bitstream may be a conforming bitstream. If the MANE device extracts the sub-bitstream in a manner defined by another one of the sub-bitstream extraction modes, the resulting bitstream may not be a conforming bitstream.

In this manner, video encoder 20 need not necessarily perform any additional tasks to ensure that the extracted sub-bitstream is conforming for all modes. This may result in fewer complications for video encoder 20 to construct the bitstream.

Accordingly, in the techniques described in this disclosure, the external means may select a sub-bitstream extraction mode from a plurality of sub-bitstream extraction modes, and the MANE device may receive a selection of the sub-bitstream extraction mode. Each of the sub-bitstream extraction modes defines a manner in which to extract coded pictures from views or layer from the bitstream to allow decoding of target output views or target output layers. As described above, in some examples, each coded picture comprises VCL NAL units of a view or a layer within an access unit. In some examples, each coded picture of a view is one of a view component, a texture view component, and a depth view component. For instance, if there is no depth data, then the coded picture of a view may be a view component. If there is depth data, then the coded picture of a view may be texture view component or a depth view component. In some examples, each coded picture of a layer is a picture of the layer.

The techniques then extract, from the bitstream, a sub-bitstream in the manner defined by the selected sub-bitstream extraction mode. The techniques output the extracted sub-bitstream to video decoder 30. It is this sub-bitstream that video decoder 30 decodes to reconstruct the target output views or layers.

As one example, the external means may select a self-complete sub-bitstream extraction mode from the plurality of sub-bitstream extraction modes, and the MANE device may receive information indicative of the selection of the self-complete sub-bitstream extraction mode. When the external means selects the self-complete sub-bitstream extraction mode, the MANE device may extract all available texture view components and depth view components of a view if a texture view or depth view of the view is needed for decoding the target output views. In other words, even if the depth view of the view is not needed for decoding the target output views, but the texture view of the view is needed, the MANE device may extract both the available texture view components and the available depth view components of the view. Similarly, even if the texture view of the view is not needed for decoding the target output views, but the depth view of the view is needed, the MANE device may extract both the available texture view components and the available depth view components of the view.

As another example, the external means may select an intermediate sub-bitstream extraction mode from the plurality of sub-bitstream extraction modes, and the MANE device may receive information indicative of the selection of the intermediate sub-bitstream extraction mode. When the external means selects the intermediate sub-bitstream extraction mode, the MANE device may extract one of: (1) all available texture view components of a view if the texture view of the view is needed for decoding the target output views, and no depth view components of the view if the depth view of the view is not needed for decoding the target output views, and (2) all available depth view components of the view if the depth view of the view is needed for decoding the target output views, and no texture view components of the view if the texture view of the view is not needed for decoding the target output views.

In other words, if the texture view is needed, but the depth view is not needed for decoding the output views, the MANE device may extract only the texture view components for outputting, and may remove the depth view components from the sub-bitstream. If the depth view is needed, but the texture view is not needed for decoding the output views, the MANE device may extract only the depth view components for outputting, and may remove the texture view components from the sub-bitstream. The manner in which the MANE device may extract only the texture view components or depth view components, as needed, is described below with respect to the maintenance of separate lists.

As yet another example, the external means may select an optimal sub-bitstream extraction mode from the plurality of sub-bitstream extraction modes, and the MANE device may receive information indicative of the selection of the optimal sub-bitstream extraction mode. When the external means selects the optimal sub-bitstream extraction mode, the MANE device may extract only texture view components and depth view components of a view that are needed for decoding the target output views, and no texture view components and depth view components of the view that are not needed for decoding the target output views. In other words, only if a texture view component or a depth view component is needed does the MANE device include the texture view component or the depth view component in the sub-bitstream. All other view components, even if from the view that includes view components in the sub-bitstream, that are not needed for decoding the target output views are removed from the sub-bitstream.

Furthermore, the MANE device may perform additional tasks to provide possible improvements for the sub-bitstream extraction currently defined by the MVC+D specification. As one example, to implement the intermediate sub-bitstream extraction mode, the MANE device may maintain separate view lists (e.g., target view lists) for texture views and depth views for a given list of target output views. For instance, the MANE device may determine the output views or may determine, from received information, the output views. For the output views, the MANE device may keep separate lists for the texture views and the depth views for the views that are needed for decoding the target output views. In other words, the MANE device may maintain a list of texture views that are to be extracted from the views, and maintain a separate list of depth views that are to be extracted from the views.

For example, if the target output views include view 0, view 1, and view 2, and view 2 is inter-view predicted with view 3, then the view list may identify view 0, view 1, view 2, and view 3 as views that need to be extracted. View 3 needs to be extracted because video decoder 30 needs view 3 to inter-predict decode view 2. However, video decoder 30 may not need both the texture view components and the depth view components of view 3 to inter-predict decode view 2. Accordingly, in the techniques described in this disclosure, the MANE device may separately maintain the texture views for views in a first view list and the depth views for views in a second view list.

For example, the MANE device may determine if a texture view component belongs to a view list of the "to be extracted" texture views. For instance, the MANE device may determine whether a texture view component belongs to a texture view identified in the list of texture views. If the view component is a "to be extracted" texture view component of the view list, the MANE device may extract the texture view component for output in the sub-bitstream. If the view component does not belong to a view list of the "to be extracted" texture views, the MANE device may not extract the texture view component for output in the sub-bitstream.

For example, the MANE device may extract the texture view component only if the texture view component belongs to the texture view identified in the list of texture views. The MANE device may avoid the extraction (e.g., avoiding extracting or avoid extracting) of a corresponding depth view component (e.g., not extract the corresponding depth view component) to the texture view component if the depth view component belongs to a depth view that is not identified in the list of depth views. In this manner, the MANE device may extract all available texture view components of a view if the texture view of the view is needed for decoding the target output views, and no depth view components of the view if the depth view of the view is not needed for decoding the target output views.

Similarly, the MANE device may determine if a view component belongs to a view list of the "to be extracted" depth views. For instance, the MANE device may determine whether a depth view component belongs to a depth view identified in the list of depth views. If the view component is a "to be extracted" depth view component of the view list, the MANE device may extract the depth view component for output in the sub-bitstream. If the view component does not belong to a view list of the "to be extracted" depth views, the MANE device may not extract the depth view component for output in the sub-bitstream.

For example, the MANE device may extract the depth view component only if the depth view component belongs to the depth view identified in the list of depth views. The MANE device may avoid the extraction of a corresponding texture view component (e.g., not extract the corresponding texture view component) to the depth view component if the texture view component belongs to a texture view that is not identified in the list of texture views. In this manner, the MANE device may extract all available depth view components of a view if the depth view of the view is needed for decoding the target output views, and no texture view components of the view if the texture view of the view is not needed for decoding the target output views.

In the above example, the MANE device may maintain two separate lists for the texture views and the depth views of the view list. For example, the list for the texture views may include the texture views of the views that are needed for decoding the texture view components of the target output views. The list for the depth views may include the depth views of the views that are needed for decoding the depth view components of the target output views.

In this example, if a depth view component is needed, but the corresponding texture view component is not needed for decoding the view components of the target output views, the MANE device may extract the depth view component, and may not extract the texture view component. Similarly, if a texture view component is needed, but the corresponding depth view component is not needed for decoding the view components of the target output views, the MANE device may extract the texture view component, and may not extract the depth view component.

In this sense, the list of texture views may include texture views whose texture view components are to be extracted, and the list of depth views may include depth views whose depth view components are to be extracted. However, a texture view of a view identified in the list of texture views may not have a corresponding depth view of the view identified in the list of depth views, and vice-versa. In other words, the list of texture views includes a texture view of at least one view, and the list of depth views does not include a corresponding depth view of the at least one view, or the list of depth views a depth view of the at least one view, and the list of texture views does not include a corresponding texture view of the at least one view. In this manner, rather than extracting both the texture view components and the depth view components for output, if only the texture view components are needed or if only the depth view components are needed, the MANE device may extract only the texture view components and the depth view components needed to decode the target output views and include only the needed texture view components or depth view components in the sub-bitstream.

In some examples, the MANE device may apply a modal scheme to determine whether the MANE device should maintain separately the view list for texture view components (i.e., a list of texture view components needed for decoding the target output views) and the view list for depth view components (i.e., a list of depth view components for decoding the target output views). For example, in a first sub-bitstream extraction mode, the MANE device may implement the sub-bitstream extraction process defined in the current MVC+D specification, and in a second sub-bitstream extraction mode, the MANE device may implement the sub-bitstream extraction process where the MANE device maintains a list of texture view components for decoding the target output views and a separate list of depth view components for decoding the target output views.

In the first sub-bitstream extraction mode (e.g., the self-complete sub-bitstream extraction mode), if the texture view component is needed, the MANE device may output both the texture view component and the depth view component in the sub-bitstream, even if the depth view component is not needed, and vice-versa. In some examples, the external means (e.g., the software, firmware, or hardware unit) of the MANE device may determine that the MANE device should extract the bitstream in accordance with the first mode, if the output sub-bitstream is required to be "fully extractable" (i.e., if one view has both texture and depth, all views must have both texture and depth). Extracting the bitstream in accordance with the first sub-bitstream extraction mode may be beneficial if the bitstream extraction is performed by a streaming server (e.g., server device 102) or an intermediate network element (e.g., routing devices 104 and/or transcoding device 106) and any subset of the views included in the output may be requested as the target output views. In other words, because any combination of the views may be needed for output, it may be beneficial for the MANE device to ensure that the output sub-bitstream is fully extractable.

In some examples, the external means may determine that the second sub-bitstream extraction mode (e.g., the intermediate sub-bitstream extraction mode) is a more appropriate manner in which the MANE device should implement the sub-bitstream extraction. For example, the external means may receive information indicating the target output views from the entity that is the end user of the video (e.g., destination device 14 or client device 108). In this example, the external means may select the second sub-bitstream extraction mode as the manner in which the MANE device performs the sub-bitstream extraction.

As another example, the entity that is the end user of the video may never request for a target output view that is not in the operation point extracted from an initial extraction. For instance, server device 102 may perform an initial extraction that results in a sub-bitstream with characteristics defined by the operation point. Transcoding device 106 may perform additional extraction. In this example, if the entity that is the end user of the video is not going to request a view that was included as part of the extraction process performed by server device 102, then the external means may select the second sub-bitstream extraction mode as the manner in which the MANE device performs the sub-bitstream extraction (e.g., by keeping separate lists for the texture view components and the depth view components, rather than a single list of view components that includes both the texture view components and the depth view components).

In some examples, in addition to keeping separate lists for the texture view components and the depth view components so that only the texture view components or depth view components that are needed for decoding the target output views are outputted in the sub-bitstream, the MANE device may further remove more view components or NAL units or parts of NAL units that are not needed for decoding the target output views. This may be part of the optimal sub-bitstream extraction technique. For example, video encoder 20 may indicate such additional view components by the non-required view component SEI message or by the inter_view_flag in the NAL unit header. Such NAL units may be include non-VCL NAL units such as sequence parameter set (SPS), picture parameter set (PPS) NAL units, and SEI NAL units. The parts of the NAL units may include SEI messages included in the SEI NAL units.

In some examples, the removal of additional view components, NAL units, or parts of NAL units may be a third sub-bitstream extraction mode that the external means can select. In some examples, the example of the removal of additional view components, NAL units, or parts of NAL units may be an alternative to the second sub-bitstream extraction mode described above.

As described above, the external means may select between the first sub-bitstream extraction mode (e.g., self-complete sub-bitstream extraction mode), the second sub-bitstream extraction mode (e.g., intermediate sub-bitstream extraction mode), or the third sub-bitstream extraction mode (e.g., optimal sub-bitstream extraction mode). For example, in the self-complete sub-bitstream extraction mode, video decoder 30 may receive sufficient video data in the output sub-bitstream to decode the target output views, as well as one or more additional views, but fewer than all the views. In the optimal sub-bitstream extraction mode, video decoder 30 may receive sufficient video data in the output sub-bitstream to decode only the target output views, and possibly no other views.

In one example of the intermediate sub-bitstream extraction mode, video decoder 30 may receive sufficient video data in the output sub-bitstream to decode the target output views, and part of the view components of the views (e.g., either the texture view component or the depth view component, but not both). In another example of the intermediate sub-bitstream extraction mode, video decoder 30 may receive sufficient video data in the output sub-bitstream to decode the target output views, and some of the views, but not all of the views.

In the techniques described in this disclosure, the external means may utilize various criteria to select a sub-bitstream extraction mode. As one example, the external means may determine whether any subset of views needs to be fully extractable, and if so, may select the self-complete sub-bitstream extraction mode. As one example, the external means may determine whether the device that is to receive the sub-bitstream should only receive enough video data to decode particular target output views (e.g., if the device requested for particular target output views, if the capabilities of the device that is to receive the sub-bitstream limits the number of views, or based on the bandwidth availability), and may select the optimal sub-bitstream extraction mode. As one example, if there is sufficient bandwidth and video decoder 30 is capable of parsing syntax elements so that video decoder 30 is capable of handling a sub-bitstream that only includes texture view components of views and not depth view components (or vice-versa), then the external means may select one of the intermediate sub-bitstream extraction modes. The external means may utilize other criteria to select the appropriate extraction mode, and the above criteria for selecting an extraction mode is provided for purposes of illustration only.

If the external means is not available, then the MANE unit may be configured to utilize the techniques of one of these modes as the default mode. For instance, the second sub-bitstream extraction mode may be the default mode if the external means is not available. Alternatively, the first sub-bitstream mode may be the default mode if the external means is not available.

The above described various modes of sub-bitstream extraction for examples where the video data includes depth data (e.g., depth views). However, for some video coding standards, such as the MVC extension to H.264/AVC, there are no depth data. For instance, there may only be a view component rather than two components the view component (e.g., only a view component rather than a texture view component and a depth view component). The techniques described in this disclosure may be applicable to cases where there is no depth data.

As one example, one of the plurality of sub-bitstream extraction modes may be a self-complete sub-bitstream extraction mode for video data that does not include depth data. When the external means selects the self-complete sub-bitstream extraction mode for video data that does not include depth data, the MANE device may extract all view components from a view that is needed for decoding the target output views.

As another example, one of the plurality of sub-bitstream extraction modes may be an optimal sub-bitstream extraction mode for video data that does not include depth data. When the external means selects the optimal sub-bitstream extraction mode for video data that does not include depth data, the MANE device may extract only view components from a view that are needed for decoding the target output views, and no view components from the view that are not needed for decoding the target output views.

Similarly, in the techniques described in this disclosure, there may be various sub-bitstream extraction modes for scalable video coding. As one example, one of the plurality of sub-bitstream extraction modes may be a self-complete sub-bitstream extraction mode for scalable video coding. When the external means selects the self-complete sub-bitstream extraction mode for scalable video coding, the MANE device may extract all pictures of a layer when the layer is needed for decoding the target output layers.

As another example, one of the plurality of sub-bitstream extraction modes may be an optimal sub-bitstream extraction mode for scalable video coding. When the external means selects the optimal sub-bitstream extraction mode for scalable video coding, the MANE device may extract only pictures of a layer that are needed for decoding the target output layers.

As described above, the techniques described in this disclosure may be applicable for various multiview coding standards. To assist with understanding, the following describes some manners in which the techniques may be implemented in accordance with the MVC+D video coding specification and the MVC video coding specification. The description of the manner in which the techniques described in this disclosure may be implemented with respect to the MVC+D video coding specification and the MVC video coding specification is provided to ease with understanding and should not be considered limiting. The techniques described in this disclosure may be applicable to MV-HEVC, 3D-HEVC, or scalable video coding based on the HEVC standard.

As described above, the techniques described in this disclosure allow for a selection between different techniques for sub-bitstream extraction. To achieve such selection of different techniques of sub-bitstream extraction, this disclosure may utilize an extraction mode variable referred to as "extractionMode."

For example, for the sub-bitstream extraction process for MVC+D, it may be requirement of bitstream conformance that any sub-bitstream that is the output of the process specified in this technique with extractionMode equal to any value in range of 0 to 3, inclusive, depthPresentFlag equal to 0 or 1, pIdTarget (priority_id target value) equal to any value in the range of 0 to 63, inclusive, tIdTarget (temporal_id or temporalID target value) equal to any value in the range of 0 to 7, inclusive, viewIdTargetList consisting of any one or more values of viewIdTarget identifying the views in the bitstream may be conforming to the MVC+D standard.

The depthPresentFlag equal to 0 or 1 may indicate whether the depth view component is part of the view component. The variable pIdTarget, tIdTarget, viewIdTargetList, the definition of conforming bitstream, and conditions on operation points described above with respect to the current MVC+D specification are applicable here as well.

In the techniques described in this disclosure for MVC+D, in addition to the variables depthPresentFlagTarget (when present), pIdTarget (when present), tIdTarget (when present), and a list viewIdTargetList consisting of one or more values of viewIdTarget (when present), all these variables are described above, an input to the sub-bitstream extraction process may be the extractionMode variable (when present). As above, the output of the sub-bitstream extraction process may be the sub-bitstream and the list of VOIdx and VIdx- List. When extractionMode is not present as an input, the MANE may infer the value of extractionMode to be 0. When extractionMode is present, an external means, not necessarily defined the video coding specification, may determine the value of extractionMode, as described above. The values of the other variables that are the input of this sub-bitstream extraction process for MVC+D, when not present, may be inferred as described above.

In this example, if the external means determines that the value of the variable extractionMode is 0, the MANE device may implement the "self-complete sub-bitstream extraction" technique (i.e., the value of 0 for the variable extractionMode refers to the self-complete extraction technique). If the external means determines that the value of the variable extractionMode is 1, the MANE device may implement the "optimal sub-bitstream extraction" technique (i.e., the value of 1 for the variable extractionMode refers to the optimal extraction technique).

If the external means determines that the value of the variable extractionMode is 2, the MANE device may implement one example of the "intermediate sub-bitstream extraction" technique (i.e., the value of 2 for the variable extractionMode refers to a first example of the intermediate sub-bitstream extraction technique).

If the external means determines that the value of the variable extractionMode is 3, the MANE device may implement another example of the "intermediate self-complete extraction" technique (i.e., the value of 3 for the variable extractionMode refers to a second example of the intermediate self-complete extraction technique). This second example of the intermediate self-complete extraction technique may be similar to sub-bitstream extraction technique specified in the latest draft of the 3D-AVC standard. For instance, in this second example of the intermediate self-complete extraction technique, if a texture view component or a depth view component of a view is required, but not both, the MANE device may still include both the texture view component and the depth view component.

Also, in this second example of the intermediate self-complete extraction technique, some of the texture view components and depth view components of a view may not be needed, but other may be needed. If neither the depth view component nor the texture view component of a view is needed, then the MANE device may not include either of the texture view component or depth view component. For instance, in the self-complete extraction technique, even if neither the texture view component nor depth view component of a view is needed, the sub-bitstream may include both the texture view component and the depth view component so that the view is fully extractable. In this example, for the intermediate sub-bitstream extraction technique, if neither the texture view component and the depth view component of the view is needed, then neither is included in the sub-bitstream, but if one of the target view component or the depth view component of the view is needed, then both are included in the sub-bitstream, regardless of whether both the texture view component and depth view component are needed.

As described above, the value of the variable extractionMode may define whether the MANE device implements sub-bitstream extraction for the MVC+D video coding specification. The manner in which the MANE device implements the various example sub-bitstream extraction techniques for MVC+D is described in more detail below.

The above described MVC+D, the following describes MVC. For instance, the MVC, there may be no depth component, and therefore, the depthPresentFlagTarget may not be necessary. Also, the value of the variable extractionMode may be limited to 0 or 1, because there may be fewer extraction modes since there may be no depth view component in MVC. For example, one of the extraction modes may be a self-complete sub-bitstream extraction mode for video data that does include depth data, as described above. Another one of the extraction modes may be an optimal sub-bitstream extraction mode for video data that does not include depth data, as described above.

For MVC, it may be a requirement of bitstream conformance that any sub-bitstream that is the output of the process specified in the technique with extractionMode equal to any value in range of 0 to 1, inclusive, pIdTarget (priority_id target value) equal to any value in the range of 0 to 63, inclusive, tIdTarget (temporal_id or temporalID target value) equal to any value in the range of 0 to 7, inclusive, viewIdTargetList consisting of any one or more values of viewIdTarget identifying the views in the bitstream may be conforming to the MVC standard. The variable pIdTarget, tIdTarget, viewIdTargetList, the definition of conforming bitstream, and conditions on operation points described above with respect to the current MVC specification are applicable here as well.

In the techniques described in this disclosure for MVC, in addition to the variables pIdTarget (when present), tIdTarget (when present), and a list viewIdTargetList consisting of one or more values of viewIdTarget (when present), all these variables are described above, an input to the sub-bitstream extraction process may be the extractionMode variable (when present). As above, the output of the sub-bitstream extraction process may be the sub-bitstream and the list of VOIdx and VIdxList. When extractionMode is not present as an input, the MANE may infer the value of extractionMode to be 0. When extractionMode is present, an external means, not necessarily defined the video coding specification, may determine the value of extractionMode, as described above. The values of the other variables that are the input of this sub-bitstream extraction process for MVC, when not present, may be inferred as described above.

In some examples, for MVC, if extractionMode is equal to 1, the MANE device may derive the sub-bitstream by applying the steps specified in the current MVC specification in sequential order. If extractionMode is equal to 0, the MANE device may derive the sub-bitstream by applying the steps described further below. For example the following first describes techniques for implementing the various modes of MVC+D, and then describes techniques for implementing a sub-bitstream extraction mode for MVC that is different than the techniques in the current MVC specification.

The above described example modes that the MANE device may implement for purposes of sub-bitstream extraction in MVC+D. For instance, the MANE device may derive the target view list as part of the sub-bitstream. To implement the example modes for sub-bitstream extraction, this disclosure describes some modifications to the current MVC+D video coding specification.

For instance, subclause A.1.1.4 of the MVC+D video coding specification is directed to the Derivation process for required anchor view components. For this section, the MVC specification subclause H.8.5.1 may apply twice, once with the "view component" substituted by "texture view component" and with "required for anchor" substituted with "required for anchor texture" and once with the "view component" substituted by "depth view component" and with "required for anchor" substituted with "required for anchor depth."

Subclause A.1.1.5 of the MVC+D video coding specification is directed to the Derivation process for required non-anchor view components. For this section, the MVC specification subclause H.8.5.2 may apply twice, once with the "view component" substituted by "texture view component" and with "required for anchor" substituted by "required for anchor texture" and once with the "view component" substituted with "depth view component" and with "required for anchor" substituted with "required for anchor depth."

The following describes examples of the manner in which the MANE device may implement the optimal extraction mode for MVC+D (e.g., where the minimize size of the sub-bitstream is maintained so that only the video data needed to decode the target output views is included in the sub-bitstream). For instance, the value of the extractionMode variable may be 1. The depthPresentFlagTarget may be equal to 0 or 1.

The MANE device may implement a substantially similar extraction technique as what is currently described in the MVC+D video coding specification, and which is described above in detail. However, there may be some differences. For example, as described above for the current MVC+D specification, two of the conditions for marking all VCL NAL units and filler data NAL units as "to be removed from bitstream" in the current MVC+D specification are: anchor_pic_flag is equal to 1 and view_id is not marked as "required for anchor" and anchor_pic_flag is equal to 0 and view_id is not marked as "required for non-anchor." For the optimal extraction mode of MVC+D, these two conditions may be changed to: anchor_pic_flag is equal to 1, nal_unit_type is not 21, and view_id is not marked as "required for anchor texture" and anchor_pic_flag is equal to 0, nal_unit_type is not 21, and view_id is not marked as "required for non-anchor texture."

Moreover, for the optimal extraction mode of MVC+D, the following two conditions may be added for when al VCL NAL units and filler data NAL units may be marked as "to be removed from the bitstream." The first additional condition may be that: anchor_pic_flag is equal to 1, nal_unit_type is 21, and view_id is not marked as "required for anchor depth." The second additional condition may be that: anchor_pic_flag is equal to 0, nal_unit_type is 21, and view_id is not marked as "required for non-anchor depth." The other steps for sub-bitstream extraction may be same as described above for the current sub-bitstream extraction in MVC+D.

The following describes examples of the manner in which the MANE device may implement an example of the self-complete intermediate extraction mode for MVC+D. For instance, the value of the extractionMode variable may be 2. The depthPresentFlagTarget may be equal to 0 or 1.

In this example, the texture and depth view components of the target output views may have different dependency. For instance, the texture view components of the target output views may be inter-view predicted from different target views than the depth view components of the target output views. In other words, both the texture view components and the depth view components from the views may not be included in the sub-bitstream, and only the needed texture view components or depth view components of the views are included in the output sub-bitstream. Also, in some examples, after each extraction, the remaining sub-bitstream may be further extracted to support a target output view list. This target output view list may be a subset or the same as the target output view list of the original input bitstream during the first sub-bitstream extraction.

In this example for the intermediate sub-bitstream extraction technique, for each view, if its view_id is marked as "required for anchor texture" or "required for non-anchor texture," the view_id is marked as "required for texture." Also, for each view, if its view_id is marked as "required for anchor depth" or "required for non-anchor depth," the view_id is marked as "required for depth." As above, the view_id of the base view may always be marked as "required for texture."

For the intermediate sub-bitstream extraction technique, the MANE device may implement a substantially similar extraction technique as what is currently described in the MVC+D video coding specification, and which is described above in detail. However, there may be some differences. For example, as described above for the current MVC+D specification, three of the conditions for marking all VCL NAL units and filler data NAL units as "to be removed from bitstream" in the current MVC+D specification are: anchor_pic_flag is equal to 1 and view_id is not marked as "required for anchor," anchor_pic_flag is equal to 0 and view_id is not marked as "required for non-anchor," and nal_ref_idc is equal to 0 and inter_view_flag is equal to 0 and view_id is not equal to any value in the list viewIdTargetList.

For the intermediate self-completeness extraction technique, these three conditions may be modified as follows. In the following, strikethrough indicates deletion relative to the current proposed standard, and is used to better understand when a condition is deleted. The first condition may be modified to anchor pic flag is equal to 1 nal_unit_type is not 21 and view_id is not marked as "required for anchor texture." The second condition of anchor_pic_flag is equal to 0 may be removed (i.e., anchor_pic_flag is equal to 0, nal_unit_type is not 21 and view_id is not marked as "required for non-anchor texture"). The third condition of nal_ref_idc is equal to 0 may also be removed (i.e., nal_ref_idc is equal to 0 and inter_view_flag is equal to 0 and view_id is not equal to any value in the list viewIdTargetList). In the above text, bold and italics is used to indicate removal of language from the condition as the modification to the respective conditions.

For the intermediate sub-bitstream extraction technique, the following condition may be added for when all VCL NAL units and filler data NAL units are "to be removed from the bitstream." The condition may be nal_unit_type is 21 and view_id is not marked as "required for depth." The other steps for sub-bitstream extraction may be same as described above for the current sub-bitstream extraction in MVC+D.

The following describes examples of the manner in which the MANE device may implement an example of the self-complete extraction mode for MVC+D. For instance, the value of the extractionMode variable may be 0. In this example, the texture view component and the depth view component of one view may be jointly considered as one view component and both may be kept in the extracted sub-bitstream once either texture or depth view component is required for output or decoding.

In this example, for each view, if its view_id is marked as "required for anchor texture," "required for non-anchor texture," "required for anchor depth," or "required for non-anchor depth," the view_id may be marked as "required." Also, as above, the base view may always be marked as "required."

For the self-complete sub-bitstream extraction technique, the MANE device may implement a substantially similar extraction technique as what is currently described in the MVC+D video coding specification, and which is described above in detail. However, there may be some differences. For example, as described above for the current MVC+D specification, three of the conditions for marking all VCL NAL units and filler data NAL units as "to be removed from bitstream" in the current MVC+D specification are: anchor_pic_flag is equal to 1 and view_id is not marked as "required for anchor," anchor_pic_flag is equal to 0 and view_id is not marked as "required for non-anchor," and nal_ref_idc is equal to 0 and inter_view_flag is equal to 0 and view_id is not equal to any value in the list viewIdTargetList.

For the self-complete extraction technique, these three conditions may be modified as follows. In the following, strikethrough indicates deletion relative to the current proposed standard, and is used to better understand when a condition is deleted. The first condition may be modified to anchor_pic_flag is equal to 1, view_id is not marked as "required for texture." The second condition of anchor_pic_flag is equal to 0 may be removed (i.e., anchor_pic_flag is equal to 0, view_id is not marked as "required for non-anchor"). The third condition of nal_ref_idc is equal to 0 may also be removed (i.e., nal_ref_idc is equal to 0 and inter_view_flag is equal to 0 and view_id is not equal to any value in the list viewIdTargetList). In the above text, bold and italics is used to indicate removal of language from the condition as the modification to the respective conditions.

For the self-complete sub-bitstream extraction technique, the following condition may be added for when all VCL NAL units and filler data NAL units are "to be removed from the bitstream." The condition may be nal_unit_type is 21 and view_id is not marked as "required for depth." The other steps for sub-bitstream extraction may be same as described above for the current sub-bitstream extraction in MVC+D.

The above described examples manners in which to implement the sub-bitstream extraction modes for MVC+D. The following describes examples manners in which to implement the sub-bitstream extraction modes for MVC. One of the modes may be sub-bitstream extraction technique defined in the current proposed MVC specification, and the MANE device may implement the sub-bitstream extraction technique as defined in the current proposed MVC specification, which generally includes 10 steps. The MANE device may implement another sub-bitstream extraction mode (e.g., if the following is the mode selected by the external means) by implementing the following 11 steps described after some general remarks with respect to the sub-bitstream extraction process.

For each view, if the its view_id is marked as "required for anchor," "required for non-anchor," the view_id is marked as "required." The view_id of the base layer is always marked as "required." For the sub-bitstream extraction process, it may be a requirement of bitstream conformance that any sub-bitstream that is the output of the process specified in this subclause with pIdTarget equal to any value in the range of 0 to 63, inclusive, tIdTarget equal to any value in the range of 0 to 7, inclusive, viewIdTargetList consisting of any one or more viewIdTarget's identifying the views in the bitstream, may be conforming to the standard.

As described above, a conforming bitstream contains one or more coded slice NAL units with priority_id equal to 0 and temporal_id equal to 0. Also, it is possible that not all operation points of sub-bitstreams resulting from the sub-bitstream extraction process have an applicable level_idc or level_idc[i]. In this case, each coded video sequence in a sub-bitstream must still conform to one or more of the profiles specified in Annex A and Annex H, but may not satisfy the level constraints specified in subclauses A.3 and H.10.2, respectively.

The inputs to this process are a variable pIdTarget (when present), a variable tIdTarget (when present), and a list viewIdTargetList consisting of one or more viewIdTarget's (when present). The outputs of this process are a sub-bitstream and a list of VOIdx values VOIdxList. When pIdTarget is not present as input to this subclause, pIdTarget is inferred to be equal to 63. When tIdTarget is not present as input to this subclause, tIdTarget is inferred to be equal to 7. When viewIdTargetList is not present as input to this subclause, there may be one viewIdTarget inferred in viewIdTargetList and the value of viewIdTarget is inferred to be equal to view_id of the base view.

In the following, strikethrough indicates deletion relative to the current proposed standard, and is used to better understand when a condition is deleted. The sub-bitstream is derived by applying the following 11 operations in sequential order.

(1) Let VOIdxList be empty and minVOIdx be the VOIdx value of the base view. (2) For each viewIdTarget included in viewIdTargetList, invoke the process specified in subclause H.8.5.1 with the viewIdTarget as input. (3) For each viewIdTarget included in viewIdTargetList, invoke the process specified in subclause H.8.5.2 with the viewIdTarget as input. (4) For each view, if its view_id is marked as "required for anchor," "required for non-anchor," and "the view_id is marked as "required".

The fifth step may be to mark all VCL NAL units and filler data NAL units for which any of the following conditions is true as "to be removed from the bitstream": priority_id is greater than pIdTarget, temporal_id is greater than tIdTarget, anchor pic flag is equal to 1 and view_id is not marked as "required for anchor", anchor_pic_flag is equal to 0 and view_id is not marked as "required for non-anchor", nal ref idc is equal to 0 and inter view flag is equal to 0 and view id is not equal to any value in the list OutputVOIdxList. The sixth step may be to remove all access units for which all VCL NAL units are marked as "to be removed from the bitstream". In the above text, bold and italics is used to indicate removal of language from the condition as the modification to the respective conditions.

The seventh step may be to remove all VCL NAL units and filler data NAL units that are marked as "to be removed from the bitstream". The eighth step may be that when VOIdxList contains only one value of VOIdx that is equal to minVOIdx, remove the following NAL units: all NAL units with nal_unit_type equal to 14 or 15, all NAL units with nal_unit_type equal to 6 in which the first SEI message has payloadType in the range of 36 to 44, inclusive. In some examples, when VOIdxList contains only one value of VOIdx equal to minVOIdx, the sub-bitstream contains only the base view or only a temporal subset of the base view.

The ninth step may be to let maxTId be the maximum temporal_id of all the remaining VCL NAL units. Remove all NAL units with nal_unit_type equal to 6 that only contain SEI messages that are part of an MVC scalable nesting SEI message with any of the following properties: operation_point_flag is equal to 0 and all_view_components_in_au_flag is equal to 0 and none of sei_view_id[i] for all i in the range of 0 to num_view_components_minus1, inclusive, corresponds to a VOIdx value included in VOIdxList, operation_point_flag is equal to 1 and either sei_op_temporal_id is greater than maxTId or the list of sei_op_view_id[i] for all i in the range of 0 to num_view_components_op_minus1, inclusive, is not a subset of viewIdTargetList (i.e., it is not ture that sei_op_view_id[i] for any i in the range of 0 to num_view_components_op_minus1, inclusive, is equal to a value in viewIdTargetList).

The tenth step may be to remove each view scalability information SEI message and each operation point not present SEI message, when present. The eleventh step may be that when VOIdxList does not contain a value of VOIdx equal to minVOIdx, the view with VOIdx equal to the minimum VOIdx value included in VOIdxList is converted to the base view of the extracted sub-bitstream. An informative procedure that outlines key processing steps to create a base view is described in H.8.5.5. When VOIdxList does not contain a value of VOIdx equal to minVOIdx, the resulting sub-bitstream according to the operation steps 1-9 above does not contain a base view that conforms to one or more profiles specified in Annex A. In this case, by this operation step, the remaining view with the new minimum VOIdx value is converted to be the new base view that conforms to one or more profiles specified in Annex A.

Figure 5:
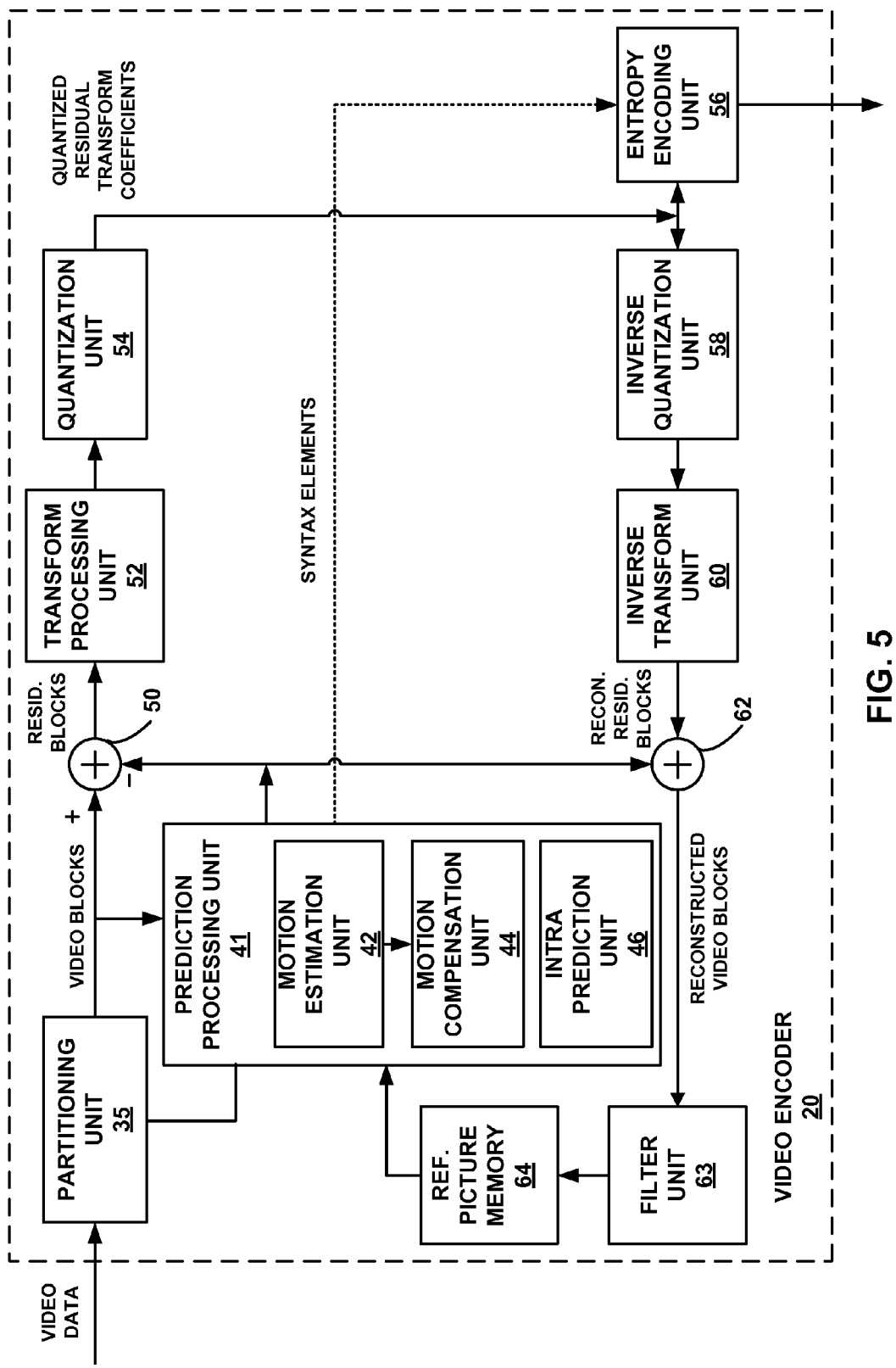
FIG. 5 is a block diagram illustrating an example video encoder that may implement the techniques described in this disclosure.

FIG. 5 is a block diagram illustrating an example video encoder 20 that may implement the techniques described in this disclosure. For example, video encoder 20 may encode video data for multiview video. In some examples, video encoder 20 may encode video data in accordance with the H.264/AVC MVC extension, MVC+D, 3D-AVC, MV-HEVC, 3D-HEVC, or scalable video coding based on HEVC as a few examples. For purposes of illustration, the techniques are described with respect to the HEVC standard. Video encoder 20 may then output the encoded bitstream that the MANE device receives and performs the sub-bitstream extraction techniques described in this disclosure.

Video encoder 20 may perform intra-coding (e.g., intra-prediction encoding) and inter-coding (e.g., inter-prediction encoding) of video blocks within video slices, as well as inter-view prediction encoding of video blocks from different views. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-view prediction refers to predicting the block from a picture in another view. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra prediction unit 46. For video block reconstruction, video encoder 20 also includes inverse quantization unit 58, inverse transform unit 60, and summer 62. Filter unit 63 may generally represent one or more loop filters such as a deblocking filter, an adaptive loop filter (ALF), and a sample adaptive offset (SAO) filter. Although filter unit 63 is shown in FIG. 5 as being an in loop filter, in other configurations, filter unit 63 may be implemented as a post loop filter, in which case unfiltered data may be used in the coding loop.

As shown in FIG. 5, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes (including inter-view prediction), for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded (e.g., inter-prediction encoded) slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction unit 46 may intra-predict a current block (intra-prediction encode), as an alternative to the inter-prediction performed by motion estimation unit 42 and motion compensation unit 44, as described above. In particular, intra prediction unit 46 may determine an intra-prediction mode to use to encode a current block. In some examples, intra prediction unit 46 may encode a current block using various intra-prediction mode (e.g., during separate encoding passes), and intra prediction unit 46 may select an appropriate intra-prediction mode to use from the tested modes. For example, intra prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction unit 46 may calculate ratios from the distortions and rates for the various encoded blocks to determine which intra-prediction mode exhibits the best rate-distortion value for the block.

In any case, after selecting an intra-prediction mode for a block, intra prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 6:
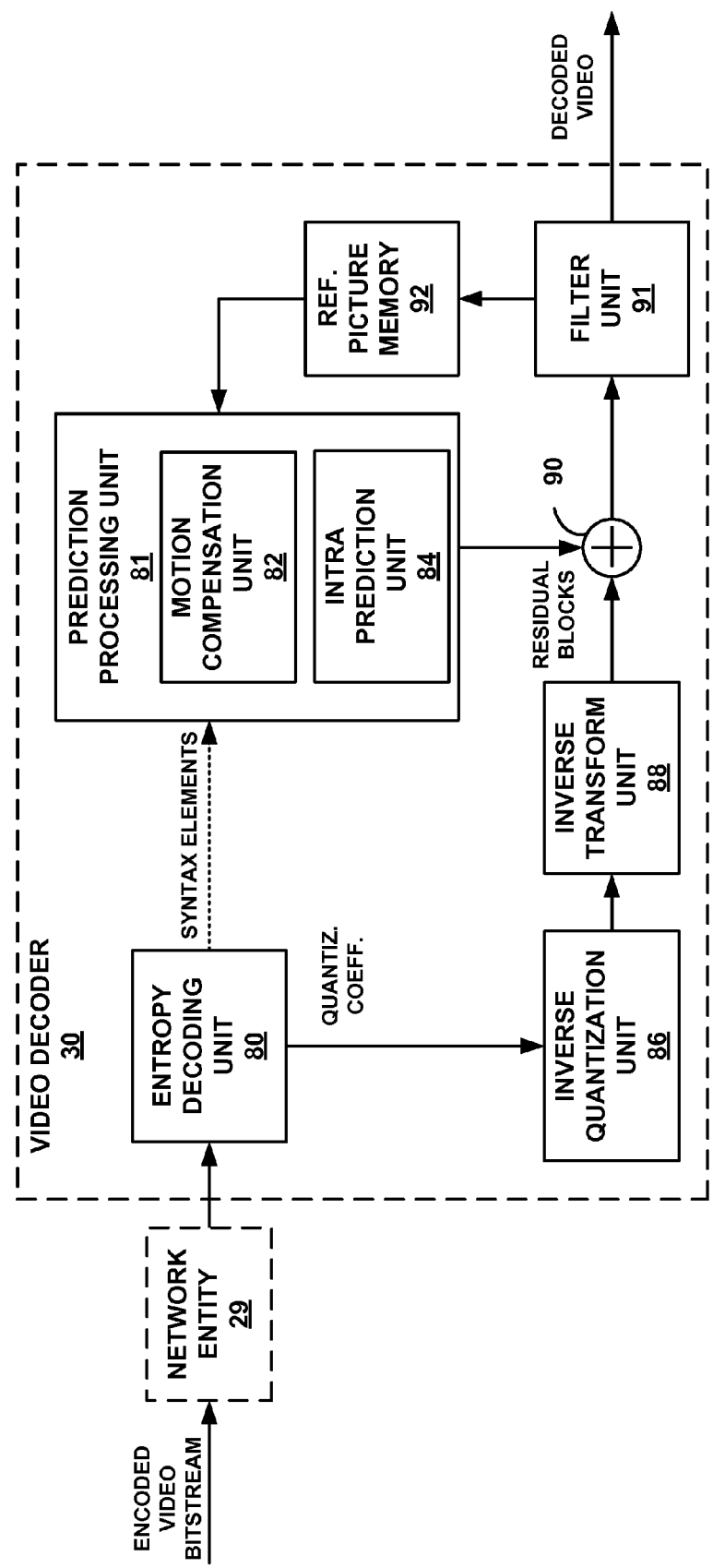
FIG. 6 is a block diagram illustrating an example video decoder that may implement the techniques described in this disclosure.

FIG. 6 is a block diagram illustrating an example video decoder 30 that may implement the techniques of this disclosure. For example, video decoder 30 may receive a sub-bitstream from the MANE device. The sub-bitstream that video decoder 30 receives may have been extracted from the bitstream utilizing techniques described in this disclosure. Video decoder 30 may decode the sub-bitstream to reconstruct the target output views.

In the example of FIG. 6, video decoder 30 includes an entropy decoding unit 80, prediction processing unit 81, inverse quantization unit 86, inverse transform unit 88, summer 90, filter unit 91, and reference picture memory 92. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. As described above, some of the techniques described in this disclosure may be implemented by network entity 29 prior to the transmission of the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes (i.e., de-quantizes) the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform (e.g., an inverse DCT, an inverse integer transform, or a conceptually similar inverse transform process) to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 may represent one or more loop filters such as a deblocking filter, an adaptive loop filter (ALF), and a sample adaptive offset (SAO) filter. Although filter unit 91 is shown in FIG. 6 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

Figure 7:
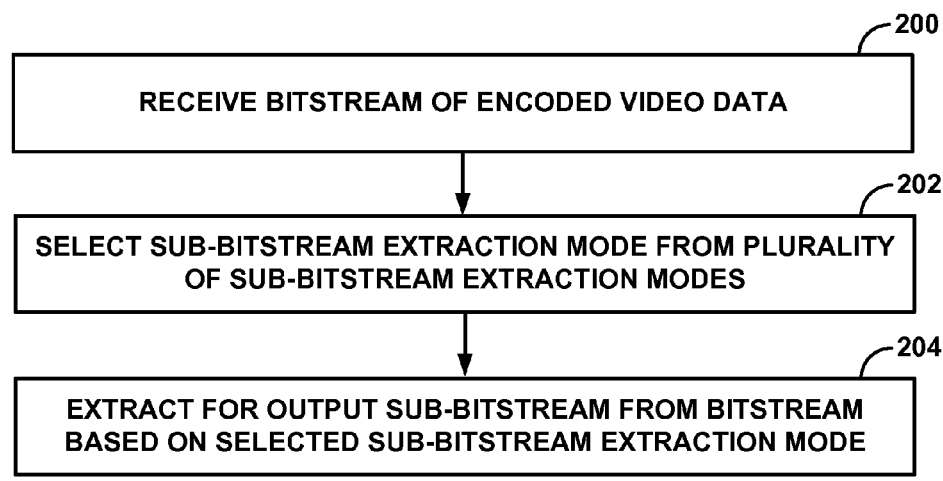
FIG. 7 is a flowchart illustrating an example technique in accordance with one or more examples described in this disclosure.

FIG. 7 is a flowchart illustrating an example technique in accordance with one or more examples described in this disclosure. For example, one or more processors of a MANE device may receive a bitstream of encoded video data (200). Video encoder 20 may have encoded the bitstream with video data for multiview coding or scalable video coding. The MANE device may be a device intermediate to video encoder 20 and video decoder 30 such as a streaming server or an intermediate device in network 100 such as routing devices 104 or transcoding device 106. In some examples, the one or more processors may be processor(s) 110.

The one or more processors may select a sub-bitstream extraction mode from a plurality of sub-bitstream extraction modes (202). Each of the sub-bitstream extraction modes may define a manner in which to extract coded pictures from views or layers from the bitstream to allow decoding of target output views or target output layers. Each coded picture comprises one or more video coding layer network abstraction layer (VCL NAL) units of a view or a layer within an access unit. For example, each coded picture of a view is one of a view component, a texture view component, and a depth view component. For example, the coded pictures may comprise view components of views (e.g., texture view components and/or depth view components or pictures of layers).

In some examples, the one or more processors may receive the sub-bitstream extraction mode from an external means. The external means may be a hardware unit or a software unit executing on the hardware unit that is external to a video decoder (e.g., video decoder 30). For example, the external means may be firmware or software, which conforms to an application processing interface (API), executing on the one or more processors. The external means may be a unit external to a video decoder (e.g., video decoder 30) that sets one or more variables that each define a sub-bitstream extraction mode and selects a value from the one or more variables, wherein the value is provided to the video decoder as an input.

For example, the one or more processors may select a self-complete sub-bitstream extraction mode if the extraction for output is being performed by a streaming server. This self-complete sub-bitstream extraction mode may be a mode in which the one or more processors extract for output both texture view components and depth view components of the views even if both the texture view components and the depth view components of the views are not needed for decoding the target output views.

The one or more processors may select a second, different sub-bitstream extraction mode (e.g., an example of the intermediate sub-bitstream extraction mode) based on one or more of available bandwidth, characteristics of the device receiving the sub-bitstream, and characteristics of a display of the device receiving the sub-bitstream. In this example, the one or more processors may maintain a list of texture view components for view components of the views that are to be extracted, and maintain a separate list of depth view components for view components of the views that are to be extracted. In the intermediate sub-bitstream extraction mode, only the texture view components or the depth view components that are needed to decode the target output views are extracted for output.

The one or more processors may select a third, different sub-bitstream extraction mode (e.g., the optimal sub-bitstream extraction mode) that extracts the minimum amount of video data needed to decode the target output views. For example, the one or more processors may select the optimal sub-bitstream extraction mode if the device receiving the sub-bitstream requests for specific target output views. In this example the one or more processors may extract for output the minimum amount of data needed to decode the target output views and no other views.

The one or more processors may extract, from the bitstream, a sub-bitstream in the manner defined by the selected sub-bitstream extraction mode (204). For example, the one or more processors may extract the sub-bitstream using the self-complete sub-bitstream extraction mode in which the one or more processors may extract for output both the depth view components and the texture view components of the views even if both the depth view components and the texture view components of the target views are not needed for decoding the target output views. As another example, the one or more processor may extract the sub-bitstream using the intermediate sub-bitstream extraction mode in which the one or more processors may extract for output only the texture view components of the views if the depth view component of the target views are not needed for decoding the target output views, or extract for output only the depth view components of the views if the texture view component of the views are not needed for decoding the target output views. As yet another example, the one or more processors may extract the sub-bitstream using the optimal sub-bitstream extraction technique in which the one or more processors extract the minimum amount of video data needed to decode the target output views.

There may be additional examples of sub-bitstream extraction modes such as those for examples where the video data does not include depth data (e.g., MVC) and scalable video coding. For instance, one example sub-bitstream extraction mode may be the self-complete sub-bitstream extraction mode for video data that does not include depth data, and another example sub-bitstream extraction mode may be the optimal sub-bitstream extraction mode for video data that does not include depth data.

For the self-complete sub-bitstream extraction mode for video data that does not include depth data, the MANE device may extract all coded pictures from a view or a layer that are need for decoding the target output views or layers. For example, MANE device may extract all view components from a view that is needed for decoding the target output views.

For the optimal sub-bitstream extraction mode for video data that does not include depth data, the MANE device may extract only coded pictures from a view or layer that are needed for decoding the target output views or layers, and no coded pictures from the view or layer that are not needed for decoding the target output views or layers. For example, the MANE device may extract only view components from a view that are needed for decoding the target output views, and no view components from the view that are not needed for decoding the target output views.

One example sub-bitstream extraction mode may be the self-complete sub-bitstream extraction mode for scalable video coding, and another example sub-bitstream extraction mode may be the optimal sub-bitstream extraction mode for scalable video coding. For the self-complete sub-bitstream extraction mode for scalable video coding, the MANE device may extract all coded pictures from a view or a layer that are need for decoding the target output views or layers. For example, the MANE device may extract all pictures of a layer when the layer is needed for decoding the target output layers.

For the optimal sub-bitstream extraction mode for scalable video coding, the MANE device may extract only coded pictures from a view or layer that are needed for decoding the target output views or layers, and no coded pictures from the view or layer that are not needed for decoding the target output views or layers. For example, the MANE device may extract only pictures of a layer that are needed for decoding the target output layers.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

In still other examples, this disclosure contemplates a computer readable medium comprising a data structure stored thereon, wherein the data structure includes comprise encoded bitstream that is coded consistent with this disclosure.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
receiving a bitstream of encoded video data;
selecting a sub-bitstream extraction mode from a plurality of sub-bitstream extraction modes, wherein each of the sub-bitstream extraction modes defines views or layers having coded pictures that are to be extracted from the bitstream to allow decoding of target output views or target output layers, wherein each coded picture comprises one or more video coding layer network abstraction layer (VCL NAL) units of a view or a layer within an access unit, wherein one or more of the coded pictures in a view or layer are inter-predicted with a picture in another view or layer, and wherein each of the sub-bitstream extraction modes for views defines a manner in which texture view components and depth view components are extracted; and
extracting, from the bitstream, a sub-bitstream in the manner defined by the selected sub-bitstream extraction mode.

2. The method of claim 1, wherein each coded picture of a view comprises one of a view component, a texture view component, and a depth view component.

3. The method of claim 2, wherein selecting a sub-bitstream extraction mode comprises selecting a self-complete sub-bitstream extraction mode, and wherein extracting the sub-bitstream comprises extracting, when the selected sub-bitstream extraction mode is the self-complete sub-bitstream extraction mode, all available texture view components and depth view components of the view if a texture view or a depth view of the view is needed for decoding the target output views.

4. The method of claim 2, wherein selecting a sub-bitstream extraction mode comprises selecting an intermediate sub-bitstream extraction mode, and wherein extracting the sub-bitstream comprises extracting, when the selected sub-bitstream extraction mode is the intermediate sub-bitstream extraction mode, one of:

all available texture view components of the view if the texture view of the view is needed for decoding the target output views, and no depth view components of the view if the depth view of the view is not needed for decoding the target output views; and
all available depth view components of the view if the depth view of the view is needed for decoding the target output views, and no texture view components of the view if the texture view of the view is not needed for decoding the target output views.

5. The method of claim 4, further comprising:
maintaining a list of texture views that are to be extracted from the views; and
maintaining a list of depth views that are to be extracted from the views,
wherein the list of texture views includes a texture view of at least one view, and the list of depth views does not include a corresponding depth view of the at least one view, or the list of depth views includes a depth view of the at least one view, and the list of texture views does not include a corresponding texture view of the at least one view,
wherein extracting all available texture view components and no depth view components comprises:
determining whether a texture view component belongs to a texture view identified in the list of texture views;
extracting the texture view component only if the texture view component belongs to the texture view identified in the list of texture views; and
avoiding extracting a corresponding depth view component to the texture view component if the depth view component belongs to a depth view that is not identified in the list of depth views,
and
wherein extracting all available depth view components and no texture view components comprises:
determining whether a depth view component belongs to a depth view identified in the list of depth views;
extracting the depth view component only if the depth view component belongs to the depth view identified in the list of depth views; and
avoiding extracting a corresponding texture view component to the depth view component if the texture view component belongs to a texture view that is not identified in the list of texture views.

6. The method of claim 2, wherein selecting a sub-bitstream extraction mode comprises selecting an optimal sub-bitstream extraction mode, and wherein extracting the sub-bitstream comprises extracting, when the selected sub-bitstream extraction mode is the optimal sub-bitstream extraction mode, only texture view components and depth view components of a view that are needed for decoding the target output views, and no texture view components and depth view components of the view that are not needed for decoding the target output views.

7. The method of claim 1, wherein selecting a sub-bitstream extraction mode comprises selecting a self-complete sub-bitstream extraction mode, and wherein extracting the sub-bitstream comprises extracting, when the selected sub-bitstream extraction mode is the self-complete sub-bitstream extraction mode, all coded pictures from the view or layer that are needed for decoding the target output views or layers.

8. The method of claim 1, wherein selecting a sub-bitstream extraction mode comprises selecting an optimal sub-bitstream extraction mode, and wherein extracting the sub-bitstream comprises extracting, when the selected sub-bitstream extraction mode is the optimal sub-bitstream extraction mode, only coded pictures from the view or layer that are needed for decoding the target output views, and no coded pictures from the view or layer that are not needed for decoding the target output views.

9. The method of claim 1, wherein selecting the sub-bitstream extraction mode comprises receiving, with external means, the sub-bitstream extraction mode, wherein the external means comprises a unit external to a video decoder, wherein the external means sets one or more variables, wherein each variable defines a sub-bitstream extraction mode, and wherein the external means selects a value from the one or more variables which is used by the video decoder for decoding the sub-bitstream and provided as input to the video decoder.

10. A device for processing video data, the device comprising:
a memory configured to store video data and
one or more processors comprising integrated and logic circuitry, the one or more processors configured to:
receive a bitstream of encoded the video data from the memory;
select a sub-bitstream extraction mode from a plurality of sub-bitstream extraction modes, wherein each of the sub-bitstream extraction modes defines views or layers having coded pictures that are to be extracted from the bitstream to allow decoding of target output views or target output layers, wherein each coded picture comprises one or more video coding layer network abstraction layer (VCL NAL) units of a view or a layer within an access unit, wherein one or more of the coded pictures in a view or layer are inter-predicted with a picture in another view or layer, and wherein each of the sub-bitstream extraction modes for views defines a manner in which texture view components and depth view components are extracted; and
extract, from the bitstream, a sub-bitstream in the manner defined by the selected sub-bitstream extraction mode.

11. The device of claim 10, wherein each coded picture of a view comprises one of a view component, a texture view component, and a depth view component.

12. The device of claim 11, wherein the one or more processors are configured to select a self-complete sub-bitstream extraction mode, and wherein, when the selected sub-bitstream extraction mode is the self-complete sub-bitstream extraction mode, the one or more processors are configured to extract all available texture view components and depth view components of the view if a texture view or a depth view of the view is needed for decoding the target output views.

13. The device of claim 11, wherein the one or more processors are configured to select an intermediate sub-bitstream extraction mode, and wherein, when the selected sub-bitstream extraction mode is the intermediate sub-bitstream extraction mode, the one or more processors are configured to extract one of:
all available texture view components of the view if the texture view of the view is needed for decoding the target output views, and no depth view components of the view if the depth view of the view is not needed for decoding the target output views; and
all available depth view components of the view if the depth view of the view is needed for decoding the target output views, and no texture view components of the view if the texture view of the view is not needed for decoding the target output views.

14. The device of claim 13, wherein the one or more processors are configured to:
maintain a list of texture views that are to be extracted from the views; and
maintain a list of depth views that are to be extracted from the views,
wherein the list of texture views includes a texture view of at least one view, and the list of depth views does not include a corresponding depth view of the at least one view, or the list of depth views includes a depth view of the at least one view, and the list of texture views does not include a corresponding texture view of the at least one view,
wherein, to extract all available texture view components and no depth view components, the one or more processors are configured to:
determine whether a texture view component belongs to a texture view identified in the list of texture views;
extract the texture view component only if the texture view component belongs to the texture view identified in the list of texture views; and
avoid extracting a corresponding depth view component to the texture view component if the depth view component belongs to a depth view that is not identified in the list of depth views,
and
wherein, to extract all available depth view components and no texture view components, the one or more processors are configured to:
determine whether a depth view component belongs to a depth view identified in the list of depth views;
extract the depth view component only if the depth view component belongs to the depth view identified in the list of depth views; and
avoid extracting a corresponding texture view component to the depth view component if the texture view component belongs to a texture view that is not identified in the list of texture views.

15. The device of claim 11, wherein the one or more processors are configured to select an optimal sub-bitstream extraction mode, and wherein, when the selected sub-bitstream extraction mode is the optimal sub-bitstream extraction mode, the one or more processors are configured to extract only texture view components and depth view components of a view that are needed for decoding the target output views, and no texture view components and depth view components of the view that are not needed for decoding the target output views.

16. The device of claim 10, wherein the one or more processors are configured to select a self-complete sub-bitstream extraction mode, and wherein, when the selected sub-bitstream extraction mode is the self-complete sub-bitstream extraction mode, the one or more processors are configured to extract all coded pictures from the view or layer that are needed for decoding the target output views or layers.

17. The device of claim 10, wherein the one or more processors are configured to select an optimal sub-bitstream extraction mode, and wherein, when the selected sub-bitstream extraction mode is the optimal sub-bitstream extraction mode, the one or more processors are configured to extract only coded pictures from the view or layer that are needed for decoding the target output views, and no coded pictures from the view or layer that are not needed for decoding the target output views.

18. The device of claim 10, wherein, to select the sub-bitstream extraction mode, the one or more processors are configured to receive, with external means, the sub-bitstream extraction mode, wherein the external means comprises a unit external to a video decoder, wherein the external means sets one or more variables, wherein each variable defines a sub-bitstream extraction mode, and wherein the external means selects a value from the one or more variables which is used by the video decoder for decoding the sub-bitstream and provided as input to the video decoder.

19. A non-transitory computer-readable storage medium having instructions stored thereon that when executed by one or more processors of a device for processing video data cause the one or more processors to:
receive a bitstream of encoded video data;
select a sub-bitstream extraction mode from a plurality of sub-bitstream extraction modes, wherein each of the sub-bitstream extraction modes defines views or layers having coded pictures that are to be extracted from the bitstream to allow decoding of target output views or target output layers, wherein each coded picture comprises one or more video coding layer network abstraction layer (VCL NAL) units of a view or a layer within an access unit, wherein one or more of the coded pictures in a view or layer are inter-predicted with a picture in another view or layer, and wherein each of the sub-bitstream extraction modes for views defines a manner in which texture view components and depth view components are extracted; and
extract, from the bitstream, a sub-bitstream in the manner defined by the selected sub-bitstream extraction mode.

20. The non-transitory computer-readable storage medium of claim 19, wherein each coded picture of a view comprises one of a view component, a texture view component, and a depth view component.

21. The non-transitory computer-readable storage medium of claim 19, the instructions that cause the one or more processors to select a sub-bitstream extraction mode comprise instructions that cause the one or more processors to select a self-complete sub-bitstream extraction mode, and wherein the instructions that cause the one or more processors to extract the sub-bitstream comprise instructions that cause the one or more processors to extract, when the selected sub-bitstream extraction mode is the self-complete sub-bitstream extraction mode, all coded pictures from the view or layer that are needed for decoding the target output views or layers.

22. The non-transitory computer-readable storage medium of claim 19, wherein the instructions that cause the one or more processors to select a sub-bitstream extraction mode comprise instructions that cause the one or more processors to select an optimal sub-bitstream extraction mode, and wherein the instructions that cause the one or more processors to extract the sub-bitstream comprise instructions that cause the one or more processors to extract, when the selected sub-bitstream extraction mode is the optimal sub-bitstream extraction mode, only coded pictures from the view or layer that are needed for decoding the target output views, and no coded pictures from the view or layer that are not needed for decoding the target output views.

23. A device for processing video data, the device comprising:
means for receiving a bitstream of encoded video data;
means for selecting a sub-bitstream extraction mode from a plurality of sub-bitstream extraction modes, wherein each of the sub-bitstream extraction modes defines views or layers having coded pictures that are to be extracted from the bitstream to allow decoding of target output views or target output layers, wherein each coded picture comprises one or more video coding layer network abstraction layer (VCL NAL) units of a view or a layer within an access unit, wherein one or more of the coded pictures in a view or layer are inter-predicted with a picture in another view or layer, and wherein each of the sub-bitstream extraction modes for views defines a manner in which texture view components and depth view components are extracted; and
means for extracting, from the bitstream, a sub-bitstream in the manner defined by the selected sub-bitstream extraction mode.

24. The device of claim 23, wherein each coded picture of a view comprises one of a view component, a texture view component, and a depth view component.

25. The device of claim 23, wherein the means for selecting a sub-bitstream extraction mode comprises means for selecting a self-complete sub-bitstream extraction mode, and wherein the means for extracting the sub-bitstream comprises means for extracting, when the selected sub-bitstream extraction mode is the self-complete sub-bitstream extraction mode, all coded pictures from the view or layer that are needed for decoding the target output views or layers.

26. The device of claim 23, wherein the means for selecting a sub-bitstream extraction mode comprises means for selecting an optimal sub-bitstream extraction mode, and wherein the means for extracting the sub-bitstream comprises means for extracting, when the selected sub-bitstream extraction mode is the optimal sub-bitstream extraction mode, only coded pictures from the view or layer that are needed for decoding the target output views, and no coded pictures from the view or layer that are not needed for decoding the target output views.

* * * * *